(12) United States Patent
Li et al.

(10) Patent No.: US 12,471,897 B2
(45) Date of Patent: Nov. 18, 2025

(54) PLUGGING DEVICE

(71) Applicant: LIFETECH SCIENTIFIC (SHENZHEN) CO., LTD., Shenzhen (CN)

(72) Inventors: Anning Li, Shenzhen (CN); Jianyong Liu, Shenzhen (CN); Yuhua Tang, Shenzhen (CN); Jia Jia, Shenzhen (CN)

(73) Assignee: LIFETECH SCIENTIFIC (SHENZHEN) CO., LTD., Shenzhen (CN)

( * ) Notice: Subject to any disclaimer, the term of this patent is extended or adjusted under 35 U.S.C. 154(b) by 340 days.

(21) Appl. No.: 18/040,180

(22) PCT Filed: Aug. 11, 2021

(86) PCT No.: PCT/CN2021/112111
§ 371 (c)(1),
(2) Date: Feb. 1, 2023

(87) PCT Pub. No.: WO2022/033530
PCT Pub. Date: Feb. 17, 2022

(65) Prior Publication Data
US 2023/0320713 A1   Oct. 12, 2023

(30) Foreign Application Priority Data

Aug. 12, 2020 (CN) .......................... 202010808213.2
Aug. 12, 2020 (CN) .......................... 202021692698.5
Aug. 12, 2020 (CN) .......................... 202021692923.5

(51) Int. Cl.
*A61B 17/00* (2006.01)
*A61B 17/12* (2006.01)

(52) U.S. Cl.
CPC .... *A61B 17/0057* (2013.01); *A61B 17/12122* (2013.01); *A61B 17/12163* (2013.01)

(58) Field of Classification Search
CPC .......... A61B 17/0057; A61B 17/12122; A61B 17/12163; A61B 17/12031;
(Continued)

(56) References Cited

U.S. PATENT DOCUMENTS

2004/0220610 A1* 11/2004 Kreidler ................. B32B 27/08
606/151
2009/0099647 A1* 4/2009 Glimsdale ........ A61B 17/12172
623/1.35
(Continued)

FOREIGN PATENT DOCUMENTS

CN       206214129 U      6/2017
CN       209437312 U      9/2019
(Continued)

OTHER PUBLICATIONS

International Search Report issued on Nov. 3, 2021, in corresponding International Patent Application No. PCT/CN2021/112111; 8 pages.
(Continued)

*Primary Examiner* — Richard G Louis
(74) *Attorney, Agent, or Firm* — Maier & Maier, PLLC

(57) ABSTRACT

A plugging device, including a first part, and a second part connected to the first part. The first part or the second part includes a plurality of braiding filaments and a gathering member; portions of the braiding filaments that are close to one ends of the braiding filaments cooperate to form a disc face. The plugging device further includes a film member. The film member at least covers part of an outer surface of the disc face; the gathering member includes an inner sleeve and an outer sleeve, both of which are hollow and sleeved; and one end of each braiding filament and at least part of a gathering region of the film member are all fixed to the gathering member.

17 Claims, 10 Drawing Sheets

(58) Field of Classification Search
CPC ........ A61B 17/12172; A61B 17/12177; A61B 2017/00575; A61B 2017/00592; A61B 2017/00597; A61B 2017/00606; A61B 2017/00615; A61B 2017/00876
See application file for complete search history.

(56) References Cited

U.S. PATENT DOCUMENTS

2020/0100797 A1* 4/2020 Wang ............... A61B 17/12122
2020/0214714 A1   7/2020 Li

FOREIGN PATENT DOCUMENTS

| CN | 111317516 A | 6/2020 |
| CN | 213552080 U | 6/2021 |
| CN | 213552081 U | 6/2021 |

OTHER PUBLICATIONS

Extended Search Report issued on Aug. 14, 2024, in corresponding European Application No. 21855581.1, 8 pages.
Office Action issued on May 23, 2025, in corresponding Chinese Application No. 202211310370.6, 18 pages.
Office Action issued on May 30, 2025, in corresponding Chinese Application No. 202211326549.0, 14 pages.
Office Action issued on Apr. 4, 2025, in corresponding European Application No. 21 855 581.1, 3 pages.

* cited by examiner

PLUGGING DEVICE

TECHNICAL FIELD

The embodiments relates to the field of interventional medical instruments, and to a plugging device used for plugging an opening in the body.

BACKGROUND

A left atrial appendage occluder, an atrial septal defect occluder, an aneurysm occluder, and other plugging devices are increasingly trusted by doctors and patients due to their characteristics that their structures achieve excellent occlusion and that there are no complications endangering patient's life after they are implanted into the body of a patient. Therefore, how to continuously improve the structure of an occluder to make it better serve patients is particularly important.

SUMMARY

Based on this, the embodiments aim to provide a plugging device capable of better serving a patient.

A plugging device includes a first part and a second part connected to the first part. The first part or the second part includes a plurality of braiding filaments and a gathering member; portions of the braiding filaments that are close to one ends of the braiding filaments cooperate to form a disc face. The plugging device further includes a film member. The film member at least covers part of an outer surface of the disc face; the gathering member includes an inner sleeve and an outer sleeve, both of which are hollow and sleeved; and one end of each braiding filament and at least part of a gathering region of the film member are all fixed to the gathering member.

In one embodiment, an open pore is formed in the gathering region of the film member, and a portion of the film member that is enclosed to form the open pore is accommodated and fixed in the gathering member.

In one embodiment, one end of the gathering member is provided with an end cap connected to the inner sleeve; and the gathering region of the film member is at least partially accommodated or fixed between the end cap and the outer sleeve.

In one embodiment, at least a portion of the disc face that is close to the gathering member is perpendicular to a central axis of the gathering member.

In one embodiment, a thread or a clamping member is arranged on an inner wall of the inner sleeve.

In one embodiment, a limiting member which radially extends or has an included angle from a central axis of the inner sleeve is arranged in a cavity of the inner sleeve.

In one embodiment, the first part or the second part further includes an extending member located at an edge of the first part or the second part; the film member further covers the extending member; and the extending member radially outwardly dilates the film member after being spread.

In one embodiment, a proximal end part of the inner sleeve and a proximal end part of the outer sleeve are enclosed to form a proximal inlet of the gathering member; a distal end part of the inner sleeve and a distal end part of the outer sleeve are enclosed to form a distal inlet of the gathering member; and one end of each of the plurality of braiding filaments is fixed between the inner sleeve and the outer sleeve after passing through the proximal inlet or the distal inlet of the gathering member.

In one embodiment, the gathering member is arranged at a proximal end of the first part or the second part; one end of each of the plurality of braiding filaments is a proximal end; when the proximal ends of the plurality of braiding filaments are received and fixed by the proximal inlet of the gathering member, the gathering region of the film member is at least partially fixed between the inner sleeve and the outer sleeve via the proximal inlet of the gathering member; or, when the proximal ends of the plurality of braiding filaments are received and fixed by the distal inlet of the gathering member, the gathering region of the film member is at least partially accommodated or fixed between the inner sleeve and the outer sleeve via the proximal inlet or the distal inlet of the gathering member.

In one embodiment, the gathering member is arranged at a distal end of the first part or the second part; one end of each of the plurality of braiding filaments is a distal end; when the distal ends of the plurality of braiding filaments are received and fixed by the proximal inlet of the gathering member, the gathering region of the film member is at least partially accommodated or fixed between the inner sleeve and the outer sleeve via the proximal inlet or the distal inlet of the gathering member; or, when the distal ends of the plurality of braiding filaments are received and fixed by the distal inlet of the gathering member, the gathering region of the film member is at least partially accommodated or fixed between the inner sleeve and the outer sleeve via the distal inlet of the gathering member.

In one embodiment, the gathering member further includes an intermediate sleeve which is hollow and sleeved between the inner sleeve and the outer sleeve.

In one embodiment, one end of each of the plurality of braiding filaments is accommodated or fixed between the outer sleeve and the intermediate sleeve, or is accommodated or fixed between the intermediate sleeve and the inner sleeve.

In one embodiment, the proximal end part of the outer sleeve and a proximal end part of the intermediate sleeve are enclosed to form an outer side proximal inlet of the gathering member, and the proximal end part of the intermediate sleeve and the proximal end part of the inner sleeve are enclosed to form an inner side proximal inlet of the gathering member; the distal end part of the outer sleeve and a distal end part of the intermediate sleeve are enclosed to form an outer side distal inlet of the gathering member; the distal end part of the intermediate sleeve and the distal end part of the inner sleeve are enclosed to form an inner side distal inlet of the gathering member; the gathering member is arranged at the proximal end of the first part or the second part; one end of each of the plurality of braiding filaments is a proximal end; and one end of each of the plurality of braiding filaments is accommodated or fixed to the gathering member after passing through one of the outer side proximal inlet, the outer side distal inlet, and the inner side distal inlet.

In one embodiment, the proximal end part of the outer sleeve and a proximal end part of the intermediate sleeve are enclosed to form an outer side proximal inlet of the gathering member, and the proximal end part of the intermediate sleeve and the proximal end part of the inner sleeve are enclosed to form an inner side proximal inlet of the gathering member; the distal end part of the outer sleeve and a distal end part of the intermediate sleeve are enclosed to form an outer side distal inlet of the gathering member; the distal end part of the intermediate sleeve and the distal end part of the inner sleeve are enclosed to form an inner side distal inlet of the gathering member; the gathering member is arranged at the distal end of the first part or the second part; one end of each of the plurality of braiding filaments is a distal end; and one end of each of the plurality of braiding filaments is accommodated or fixed to the gathering member after passing through one of the outer side proximal inlet, the inner side proximal inlet, and the outer side distal inlet.

A plugging device includes a first part. The first part includes a plurality of braiding filaments and a gathering member. One end of each braiding filament is fixed to the gathering member. The first part is provided with at least one disc face, some of the plurality of braiding filaments form a gathering portion by shape convergence; the gathering member is located in a space enclosed by the gathering portion; and at least one disc face formed by the cooperation of the gathering portion is flat and sealed.

In one embodiment, the gathering portion includes a first gathering portion and a second gathering portion; the first gathering portion and the second gathering portion are close to each other without an external force, so as to encircle the gathering member in a space enclosed by the first gathering portion and the second gathering portion; and the first gathering portion and the second gathering portion may be away from each other under the action of an external force.

In one embodiment, a maximum outer diameter of a gap formed after the first gathering portion and the second gathering portion are close to each other is less than or equal to 5 mm; or the first gathering portion and the second gathering portion are close to each other and are fitted to each other at least in a radial direction.

In one embodiment, a sealing member is arranged in the gap formed by the first gathering portion and the second gathering portion, so that the at least one disc face formed by the cooperation of the gathering portions is sealed.

In one embodiment, the first gathering portion includes at least one bulge; the second gathering portion includes at least one recess; and after the first gathering portion and the second gathering portion are close to each other, the at least one bulge is abutted against one recess.

In one embodiment, the first part is further provided with a reset member; and after the external force is withdrawn from the first gathering portion and the second gathering portion, the reset member gathers the first gathering portion and the second gathering portion.

In one embodiment, the reset member includes at least two magnets with opposite magnetisms; and the first gathering portion and the second gathering portion are gathered to each other under the action of the at least two magnets.

In one embodiment, the reset member includes a first reset rod arranged close to the first gathering portion and a second reset rod arranged close to the second gathering portion; and the first gathering portion and the second gathering portion are gathered to each other under the action of the first reset rod and the second reset rod.

In one embodiment, the reset member includes at least one elastic coil for connecting the first gathering portion with the second gathering portion, and the first gathering portion and the second gathering portion are gathered to each other under the action of the elastic coil.

In one embodiment, the plugging device further includes a film member, and the film member at least covers part of an outer surface of the gathering portion.

The above plugging device includes the following effects.

In the above plugging device, the film member is arranged on the disc face of the first part, so as to improve the sealing performance of the first part; at the same time, the end parts of the plurality of braiding filaments that are braided to form the first part are gathered and fixed by the gathering member including the inner sleeve and the outer sleeve; the gathering member accommodates and fixes a part of the gathering region of the film member, so that the part of the film member is stably fixed on the first part, and it is not easy for the film member to move on the first part or fall off from the first part.

In the plugging device, the first part is provided with the gathering portion formed by some of the plurality of braiding filaments by shape convergence; at the same time, since the disc face formed by the cooperation of the gathering portions is flat and sealed, the gathering portion can encircle the gathering member in the space enclosed by the gathering portion, and the gathering member will not protrude from the disc face located at a periphery of the first part, thus preventing blood from forming thrombi near the gathering member and improving the safety of the plugging device.

DETAILED DESCRIPTION OF THE EMBODIMENTS

In order to make the objectives, solutions and advantages of the embodiments clearer, the embodiments are further described below in detail with reference to accompanying drawings. It should be understood that the embodiments described here are merely explanatory, and are non-limiting.

It should be noted that in the field of interventional medical instruments, an end, closer to an operator, of a medical instrument that is implanted into a human body or an animal body is usually called "proximal end", and an end farther from an operator is called "distal end"; and the "proximal end" and the "distal end" of any component of a medical instrument are defined according to this principle. The "axial direction" usually refers to a length direction of a medical instrument during conveying; the "radial direction" usually refers to a direction perpendicular to the "axial direction" of the medical instrument; and the "axial direction" and the "radial direction" of any component of a medical instrument are defined according to this principle.

In the embodiments, a gathering member relatively located at a proximal end is referred to as a proximal gathering member, and a gathering member relatively located at a distal end is referred to as a distal gathering member. Similarly, a disc face relatively located at a proximal end is referred to as a proximal disc face, and a disc face relatively located at a distal end is referred to as a distal disc face. The solutions of the embodiments will be further described in detail below.

It is well known that the leakproofness of a sealing plate is one of the key factors for successful occlusion of an opening in the body. However, in the sealing plate of the existing occluder, only a disc face formed by heat setting of a mesh tube braided from braiding filaments is used for sealing. In order to achieve good sealing performance of the sealing plate, the braiding filaments of the sealing plate need to be braided more densely, so more braiding filaments are required, resulting in a larger outer diameter of the sealing plate after the sealing plate is accommodated in a sheath tube. A sheath tube having a larger inner diameter is required for cooperation. In the field of interventional medical instruments, it is better that the outer diameter of the sheath tube is smaller. Therefore, how to make the sealing plate have better sealing performance and, at the same time, make a desired sheath tube have a smaller outer diameter is a difficulty in the design of the sealing plate. In view of this, the embodiments exemplarily provide plugging devices shown in the following embodiments 1 to 9 to solve the above-mentioned problems, so that the plugging device can better serve patients.

Embodiment 1

Figure 1:
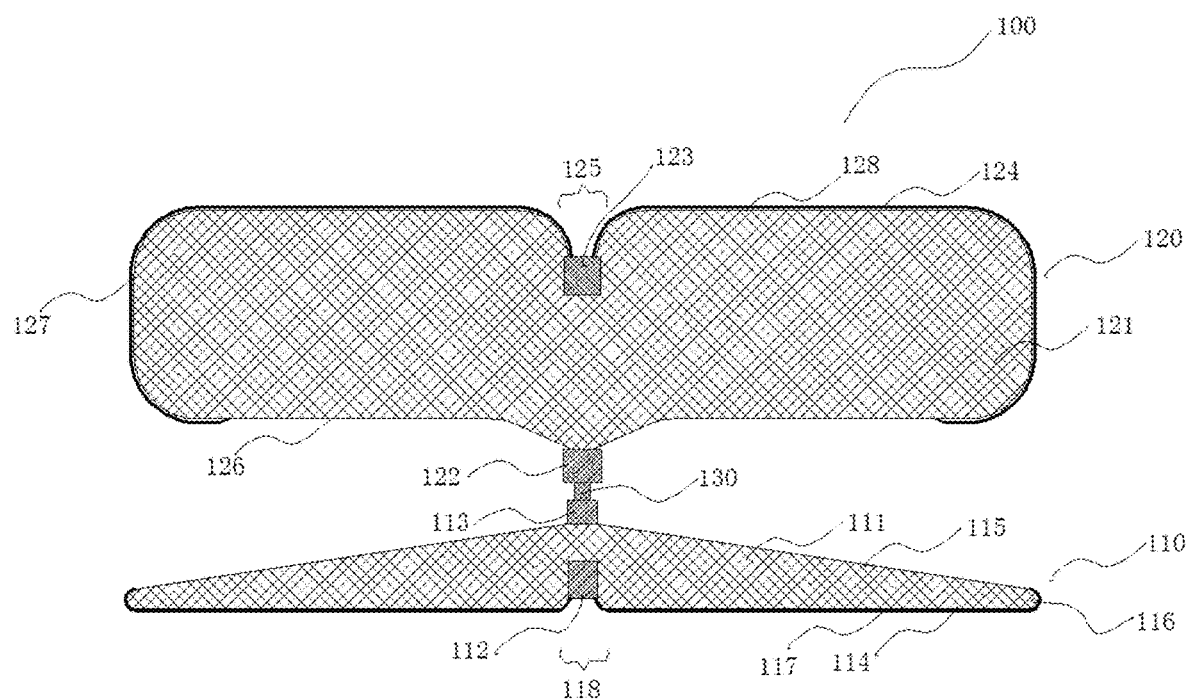
FIG. 1 is one schematic diagram of an entire structure of a plugging device in Embodiment 1.

Referring to the plugging device 100 shown in FIG. 1, the plugging device 100 includes a first part 110 relatively located at a proximal end, and a second part 120 relatively located at a distal end. A distal end of the first part 110 is directly connected to a proximal end of the second part 120, or the distal end of the first part 110 and the proximal end of the second part 120 are indirectly connected by at least one connector 130. The connector 130 may be rigid or flexible. In some embodiments, the first part 110 can be used to occlude an opening or hole in a tissue in the body, and the second part 120 can be used to fix the plugging device 100 in a cavity of the tissue in the body. For example, the plugging device 100 is used to occlude an opening in the left atrial appendage. Further, the second part 120 may also be used to occlude openings or holes in tissues in the body. In some other embodiments, both the first part 110 and the second part 120 can be used to occlude the openings or holes in the tissues in the body. For example, when the plugging device 100 is used to occlude an opening in the atrial or ventricular septum or used for patent foramen ovale, at this time, the first part 110 and the second part 120 cooperate with each other to fix the plugging device 100 in the vicinity of the opening or hole in the tissue in the body.

The first part 110 includes a plurality of braiding filaments 111 and two gathering members 112/113. Each braiding filament 111 has opposite proximal and distal ends. The plurality of braiding filaments 111 can be braided to form a mesh tube. The plurality of braiding filaments 111 also include opposite proximal ends and distal ends and form a shape of a disc or a column after heat setting. Thus, the first part 110 includes at least one proximal disc face 114 and a distal disc face 115. The proximal disc face 114 of the first part 110 is formed by the cooperation of portions of the plurality of braiding filaments 111 of the first part 110 that are close to the proximal ends of the plurality of braiding filaments 111. The distal disc face 115 of the first part 110 is formed by the cooperation of portions of the plurality of braiding filaments 111 of the first part 110 that are close to the distal ends of the plurality of braiding filaments 111. A portion, where the proximal disc face 114 and the distal disc face 115 are connected, of the first part 110 forms an edge 116 of the first part 110.

The proximal gathering member 112 of the first part 110 includes an inner sleeve and an outer sleeve, both of which are hollow and sleeved. The proximal ends of the plurality of braiding filaments 111 are accommodated and fixed between the inner sleeve and the outer sleeve, so that the proximal ends of the plurality of braiding filaments 111 are fixed to the proximal gathering member 112. The distal gathering member 113 of the first part 110 may be a hollow sleeve for accommodating and fixing the distal ends of the plurality of braiding filaments 111 inside the sleeve, so that the distal ends of the plurality of braiding filaments 111 are fixed to the distal gathering member 113. In another embodiment, the distal gathering member 113 of the first part 110 may also be of the same structure as that of the proximal gathering member 112 of the first part 110, that is, it includes an inner sleeve and an outer sleeve, both of which are hollow and sleeved. The distal ends of the plurality of braiding filaments 111 are accommodated and fixed between the inner sleeve and the outer sleeve of the distal gathering member 113.

The structure of the second part 120 is not limited, as long as the plugging device 100 can be fixed in the cavity of the tissue in the body after being released. For example, the second part 120 can be obtained by performing laser cutting on an alloy tube with a shape memory property and performing heat setting or can be obtained by braiding the plurality of braiding filaments 111 and performing heat setting. A distal portion of the second part 120 may be sealed or may have an opening. In this embodiment, the second part 120 includes a plurality of braiding filaments 121 and two gathering members 122/123. The plurality of braiding filaments 121 can be braided to form a columnar braided mesh. A proximal end of the braided mesh is accommodated and fixed by the proximal gathering member 122 of the second part 120, and a distal end of the braided mesh is accommodated and fixed by the distal gathering member 123 of the second part 120.

The proximal gathering member 122 of the second part 120 may include an inner sleeve and an outer sleeve, both of which are hollow and sleeved, and the proximal ends of the plurality of braiding filaments 121 of the second part 120 are accommodated and fixed between the inner sleeve and the outer sleeve. In another embodiment, the proximal gathering member 122 of the second part 120 can also be a hollow sleeve, and the proximal ends of the plurality of braiding filaments 121 of the second part 120 are accommodated and fixed inside the sleeve.

The distal gathering member 123 of the second part 120 can also be a hollow sleeve, and the distal ends of the plurality of braiding filaments 121 of the second part 120 are accommodated and fixed inside the sleeve. In another embodiment, the distal gathering member 123 of the second part 120 may also be of the same structure as that of the proximal gathering member 112 of the first part 110, that is, it includes an inner sleeve and an outer sleeve, both of which are hollow and sleeved. The distal ends of the braiding filaments 121 of the second part 120 are accommodated and fixed between the inner sleeve and the outer sleeve.

In other embodiments, when the first part 110 and the second part 120 are of integrated structures, the distal end of the first part 110 may not be provided with the distal gathering member 113, and the proximal end of the second part 120 may not be provided with the proximal gathering member 122.

The plugging device 100 further includes a film member, which may be disposed on the first part 110 and/or the second part 120. When the film member is disposed on the first part 110, the film member 117 covers at least an outer surface of the proximal disc face 114 of the first part 110, and a gathering region 118 of the film member 117 is at least partially fixed in the proximal gathering member 112 of the first part 110. Therefore, it is ensured that the proximal end of the first part 110 has sufficiently good sealing performance, and at the same time, the gathering region 118 of the thin film part 117 is firmly fixed by the proximal gathering member 112. In other embodiments, the film member 117 covers a part of the outer surface of the proximal disc face 114 of the first part 110, so as to improve the sealing performance of a local region of the proximal disc face 114 as required. In other embodiments, the film member 117 on the first part 110 may further cover the edge 116 of the first part 110. Further, in other embodiments, the film member 117 on the first part 110 may also cover the distal disc face 115 of the first part 110, that is, the film member 117 covers the proximal disc face 114, the edge 116, and the distal disc face 115 of the first part 110. The gathering region 118 of the film member 117 refers to a portion of the film member 117 located near the gathering member, and the gathering member may be located in a center or at other positions of the film member 117. When the film member 117 is fixed by the proximal gathering member 112 or the distal gathering member 123, the gathering region 118 of the film member 117 may refer to a portion of the film member 117 that is close to the corresponding proximal gathering member 112 or distal gathering member 123. Similarly, a gathering region 125 of a film member 124 on the second part 120 can be defined.

The film member 117 can be made of polyethylene terephthalate (PET) film or polytetrafluoroethylene (PTFE) film, so the film member has good sealing performance, and endothelial crawling on the film member 117 can be promoted under the impact of blood flow, thereby further improving the sealing performance.

Figure 2:
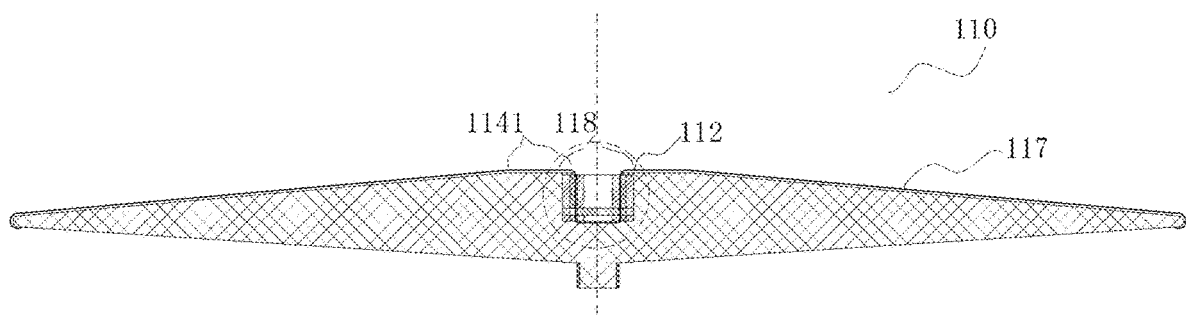
FIG. 2 is one schematic structural diagram of a first part in Embodiment 1.
Figure 3:
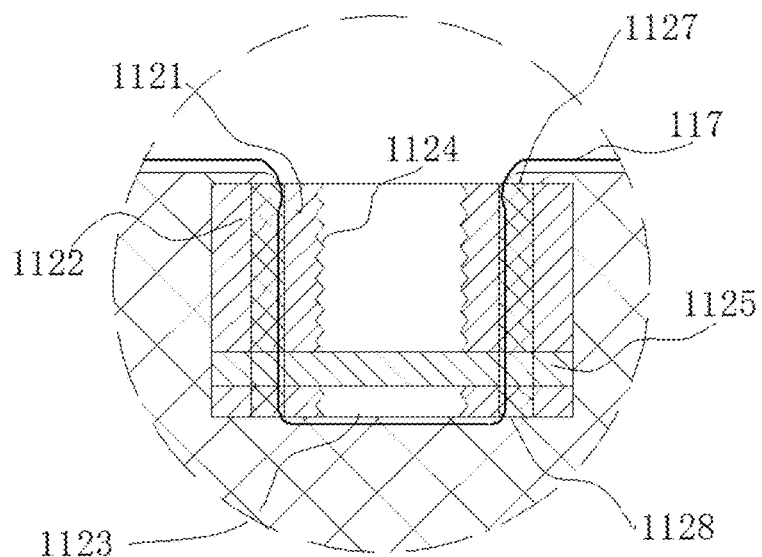
FIG. 3 is an enlarged schematic structural diagram of a round dotted line part in FIG. 2.

As shown in FIG. 1 to FIG. 3, the proximal disc face 114 and the edge 116 of the first part 110 are wrapped with the film member 117, and there may be one or more layers of film members 117. A portion of the gathering region 118 of the film member 117 is fixed in the proximal gathering member 112 of the first part 110. For example, the portion can be clamped between the inner sleeve 1121 and the outer sleeve 1122 of the proximal gathering member 112 for being fixed or can be snapped on the inner sleeve 1121 and the outer sleeve 1122 and is relatively fixed after the inner sleeve 1121 and the outer sleeve 1122 are connected together. Other portions of the film member 117 may be sutured to the proximal disc face 114 of the first part 110 by a suture or adhered to the proximal disc face 114 of the first part 110 by an adhesive. An edge of the film member 117 covers the edge 116 of the first part 110, which can reduce injury, such as scratching, caused by the edge 116 of the first part 110 to the tissue in the body. The edge of the film member 117 can be fixed on the braiding filament 111 at the edge 116 by a suture or fixed at the edge 116 by being adhered by an adhesive. The proximal ends of the plurality of braiding filaments 111 on the first part 110 are fixed between the inner sleeve 1121 and the outer sleeve 1122 of the proximal gathering member 112, and the fixing way may be clamping the proximal ends by the inner sleeve 1121 and the outer sleeve 1122 for fixing, or may be fixing the proximal ends of the plurality of braiding filaments 111 at the distal end part of the outer sleeve 1122 in a manner of welding or other manners. The manner of fixing is not limited.

The film member 117 can be an intact round film without obvious open pores. After the film member 117 is sandwiched between the inner sleeve 1121 and the outer sleeve 1122 of the proximal gathering member 112; a distal opening 1123 of the inner sleeve 1121 is covered by a most central portion of the film member 117, thereby blocking the distal opening 1123 of the inner sleeve 1121 so as to prevent the blood flow from flowing into the first part 110 through the inner sleeve 1121, thereby improving the sealing performance of the plugging device 100.

Further, an inner wall of the inner sleeve 1121 of the proximal gathering member 112 of the first part 110 is provided with a thread 1124 or a fastener which can cooperate with a distal end of a delivery steel cable to realize detachable connection, so as to achieve the following purposes: when the proximal gathering member 112 of the first part 110 is connected to the delivery steel cable, delivering the plugging device 100, and when the connection is cut off, thoroughly releasing the plugging device 100 and withdrawing the delivery steel cable. In other embodiments, the inner wall of the inner sleeve 1121 of the gathering member may not be provided with the thread 1124 or fastener.

Further, a limiting member 1125 radially extending or having an included angle from a central axis of the inner sleeve 1121 is arranged in a cavity of the inner sleeve 1121 of the proximal gathering member 112 of the first part 110. It can be used to limit a depth of the delivery steel cable extending into the inner sleeve 1121 when the delivery steel cable is connected to the proximal gathering member 112, thus preventing the distal end of the delivery steel cable from poking the film member 117 located on a distal end face of the proximal gathering member 112, and can also be used to fix the film member 117 on the proximal gathering member 112 to further enhance the stability of the film member 117 in the proximal gathering member 112. In this embodiment, the limiting member 1125 is a plug that penetrates through a sleeve wall of the inner sleeve 1121 and a sleeve wall of the outer sleeve 1122 of the proximal gathering member 112. Two opposite through holes are formed in the sleeve wall of the inner sleeve 1121, and two opposite through holes are also formed in the sleeve wall of the outer sleeve 1122. One end of the plug passes through the through hole of the outer sleeve 1122, the through hole of the inner sleeve 1121, the through hole of the inner sleeve 1121, and the through hole of the outer sleeve 1122 from the outside to the inside in turn. Two ends of the plug are respectively finally accommodated and fixed in the two through holes of the outer sleeve 1122. In other embodiments, the limiting member 1125 can also be other rodlike components, and the two ends of the limiting member 1125 can also extend out of the sleeve wall of the outer sleeve 1122. After the two ends of the limiting member 1125 extend out of the sleeve wall of the outer sleeve 1122, the limiting member 1125 is limited from moving in a radial direction by shape constraining. For example, the two ends of the limiting member 1125 are designed to be ball heads or bulges in other shapes, as long as an outer diameter of each bulge in an axial direction is greater than a diameter of the through holes, used to accommodate the limiting member 1125, on the sleeve wall of the outer sleeve 1122. In other embodiments, the limiting member 1125 only penetrates through the sleeve wall of the inner sleeve 1121, and the two ends of the limiting member 1125 are respectively accommodated and fixed in the two through holes of the inner sleeve 1121. In other embodiments, no limiting member 1125 may be provided in the proximal gathering member 112.

In this embodiment, at least a portion 1141 of the proximal disc face 114 of the first part 110 that is close to the proximal gathering member 112 is perpendicular to a central axis of the proximal gathering member 112, thereby forming a relatively flat disc face near the proximal gathering member 112, so as to avoid the risk of thrombosis near the proximal gathering member 112 and improve the safety. The flat disc face means that there are no obvious protruding portions on a surface of the disc face. Even if there are several protruding portions, the height of these protruding portions protruding outwardly relative to other portions is less than or equal to 2 mm.

Figure 4:
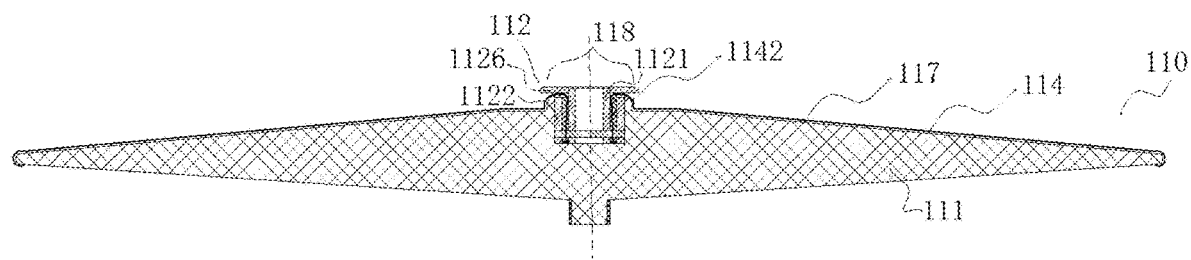
FIG. 4 is another schematic structural diagram of a first part in Embodiment 1.

In other embodiments, as shown in FIG. 4, at least a portion 1142 of the proximal disc face 114 of the first part 110 close to the proximal gathering member 112 may be arranged not to be perpendicular to the central axis of the proximal gathering member 112.

Figure 5:
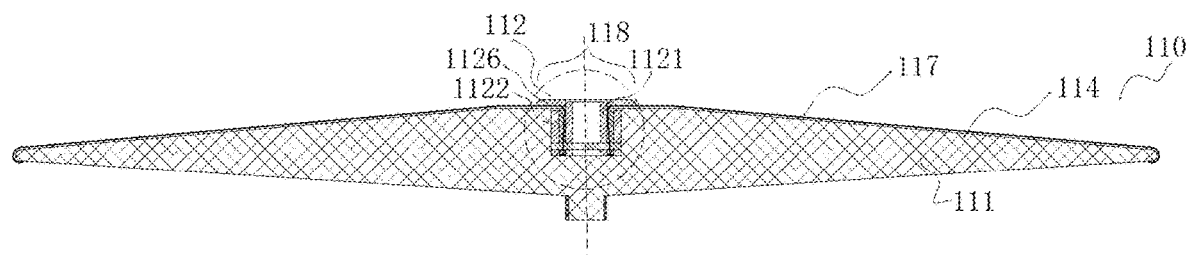
FIG. 5 is another schematic structural diagram of a first part in Embodiment 1.
Figure 6:
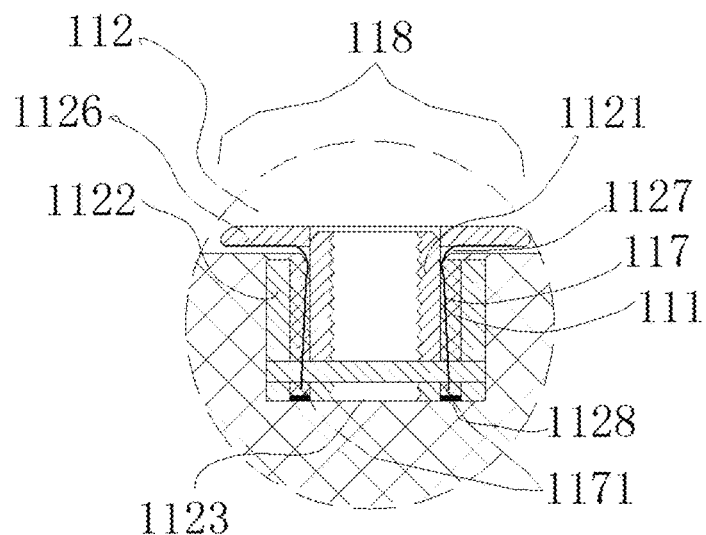
FIG. 6 is an enlarged schematic structural diagram of a round dotted line part in FIG. 5.

Further, in other embodiments, as shown in FIG. 4 to FIG. 6, the proximal end of the proximal gathering member 112 is provided with an end cap 1126 connected to the inner sleeve 1121, and the gathering region 118 of the film member 117 is at least partially accommodated or fixed between the end cap 1126 and the outer sleeve 1122, so as to further stably fix the film member 117 in the proximal gathering member 112. The proximal ends of the plurality of braiding filaments 111 on the first part 110 extend from a gap between the end cap 1126 and the outer sleeve 1122 into a gap between the inner sleeve 1121 and the outer sleeve 1122 until they extend to a distal end part of the outer sleeve 1122, and are then fixed at the distal end of the distal gathering member 112 in a manner of welding or other manners. For example, as one implementation mode, the proximal ends can be fixed between the distal end part of the outer sleeve 1122 and the distal end part of the inner sleeve 1121. In other embodiments, the distal end of the proximal gathering member 112 may also be provided with an end cap 1126 connected with the outer sleeve 1122 or the inner sleeve 1121, so as to further stably fix the film member 117 in the proximal gathering member 112, and the opening of the distal end of the proximal gathering member 112 can also be blocked to improve the sealing performance.

Figure 11:
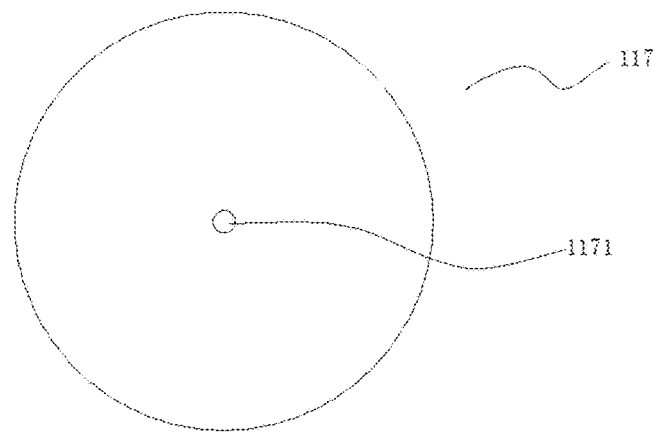
FIG. 11 is a schematic diagram of a spread structure of a film member provided with an open pore in Embodiment 1.

In the embodiment shown in FIG. 5 and FIG. 6, the gathering region 118 of the film member 117 is provided with an open pore 1171 as shown in FIG. 11, and a portion of the film member 117 that is enclosed to form the open pore 1171 is accommodated and fixed in the proximal gathering member 112. For example, after the portion of the film member 117 that is enclosed to form the open pore 1171 extends from the gap between the end cap 1126 and the outer sleeve 1122 to the gap between the inner sleeve 1121 and the outer sleeve 1122, the portion is annular or tubular, and is clamped between the inner sleeve 1121 and the outer sleeve 1122 together with some of the plurality of braiding filaments 111. This film member 117 can be used in such a situation where the distal opening 1123 of the proximal gathering member 112 needs to be opened, for example, a situation where a substance or component needs to be delivered to the distal end through the distal opening 1123. In other embodiments, the end cap 1126 may be provided with a slot, and the portion of the film member 117 that is enclosed to form the opening 1171 may be fixedly clamped in the slot of the end cap 1126. The manner is not limited. In other embodiments, the limiting member 1125 or end cap 1126 may not be provided in the proximal gathering member 112, and the thread 1124 or fastener may not be provided in the inner sleeve 1121, either.

Figure 7:
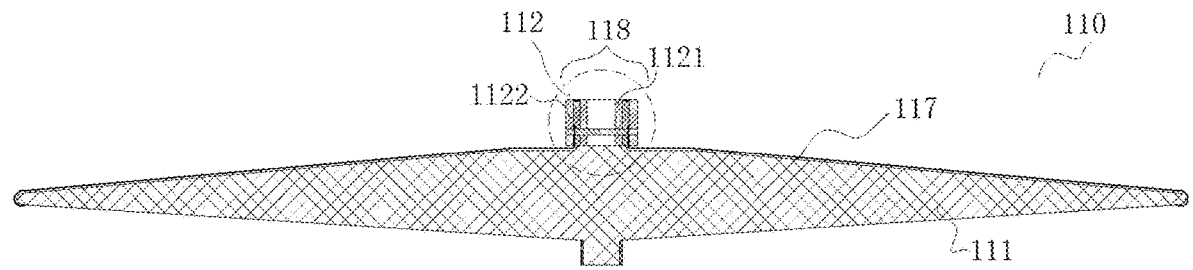
FIG. 7 is another schematic structural diagram of a first part in Embodiment 1.
Figure 8:
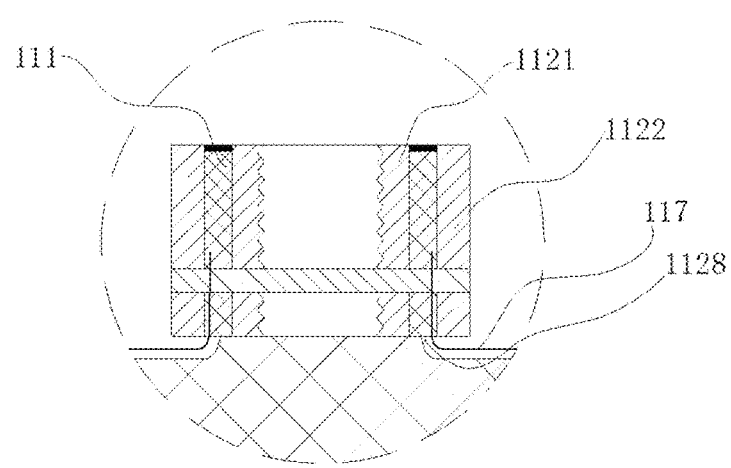
FIG. 8 is an enlarged schematic structural diagram of a round dotted line part in FIG. 7.
Figure 9:
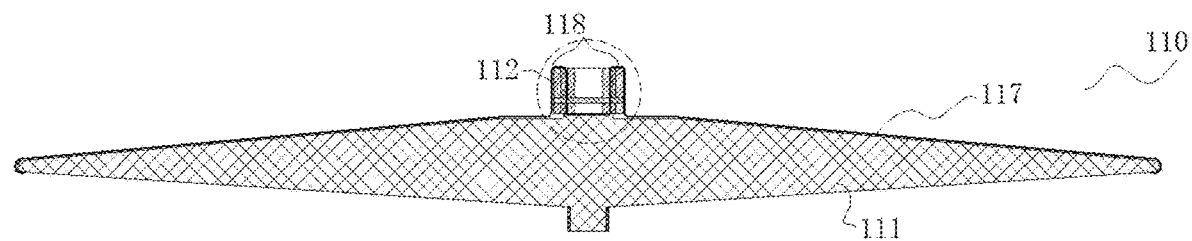
FIG. 9 is another schematic structural diagram of a first part in Embodiment 1.
Figure 10:
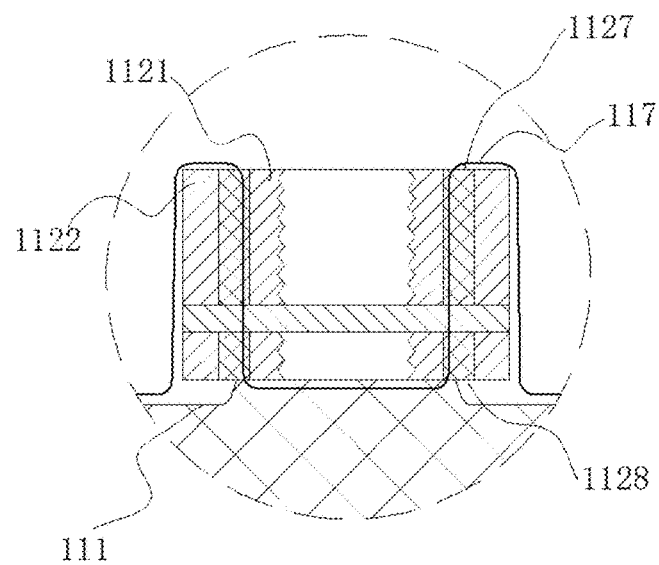
FIG. 10 is an enlarged schematic structural diagram of a round dotted line part in FIG. 9.

A proximal end part of the inner sleeve 1121 and a proximal end part of the outer sleeve 1122 are enclosed to form a proximal inlet of the proximal gathering member 112; a distal end part of the inner sleeve 1121 and a distal end part of the outer sleeve 1122 are enclosed to form a distal inlet of the proximal gathering member 112; and the proximal ends of the plurality of braiding filaments 111 of the first part 110 are accommodated or fixed between the inner sleeve 1121 and the outer sleeve 1122 after passing through the proximal inlet or the distal inlet of the proximal gathering member 112. For example, when the proximal ends of the plurality of braiding filaments 111 of the first part 110 are received and fixed through the proximal inlet of the proximal gathering member 112, as shown in FIG. 3 and FIG. 6, the gathering region 118 of the film member 117 is at least partially fixed between the inner sleeve 1121 and the outer sleeve 1122 via the proximal inlet 1127 of the proximal gathering member 112. When the proximal ends of the plurality of braiding filaments 111 of the first part 110 are received and fixed through the distal inlet 1128 of the proximal gathering member 112, as shown in FIG. 7 and FIG. 8, the gathering region 118 of the film member 117 is at least partially accommodated or fixed between inner sleeve 1121 and outer sleeve 1122 via the distal inlet 1128 of the proximal gathering member 112. In other embodiments, when the proximal ends of the plurality of braiding filaments 111 of the first part 110 are received and fixed through the distal inlet 1128 of the proximal gathering member 112, as shown in FIG. 9 and FIG. 10, the gathering region 118 of the film member 117 is at least partially accommodated or fixed between inner sleeve 1121 and outer sleeve 1122 via the proximal inlet 1127 of the proximal gathering member 112.

In other embodiments, at least one layer of blow blocking film is further arranged inside the first part 110 and is used to prevent blood from flowing into the first part 110 from the proximal disc face 114 of the first part 110, thereby further improving the occlusion performance of the first part 110.

Embodiment 2

The same parts of the plugging device of Embodiment 2 as those of Embodiment 1 will not be repeated here. A difference between the two embodiments is that the proximal gathering member 112 or the distal gathering member 113 of the first part 110 described in Embodiment 1 can also be used for the second part 120.

For example, similar to the structure shown in FIG. 1, the film member 124 of the second part 120 covers the outer surface and the edge 127 of the proximal disc face 126 of the second part 120, and the gathering region 125 of the film member 124 is at least partially fixed in the proximal gathering member 122 of the second part 120. The edge 127 of the second part 120 is a side portion between the proximal disc face 126 and the distal disc face 128 of the second part 120. Further, in other embodiments, the film member 124 on the second part 120 may further cover the distal disc face 128 of the second part 120, that is, the film member 124 covers the proximal disc face 126, the edge 127, and the distal disc face 128 of the second part 120. In other embodiments, the film member 124 of the second part 120 covers only the outer surface of the proximal disc face 126 or the outer surface of the distal disc face 128, or the outer surface and the edge 127 of the distal disc face 128 of the second part 120. In other embodiments, the film member 124 can cover a part of the outer surface of the proximal disc face 126 or the distal disc face 128 to improve the sealing performance of a local region of the proximal disc face 126 or the distal disc face 128 as required. On this basis, the above-mentioned various specific structures of the proximal gathering member 112 provided on the first part 110 in Embodiment 1, as well as the above-mentioned various specific manners for accommodating and fixing the proximal ends of the plurality of braiding filaments 111 and the gathering region 118 of the film member 117 are also applicable to the proximal gathering member 122 on the second part 120, and details are not described here again.

Embodiment 3

The same parts of the plugging device of Embodiment 3 as those of Embodiment 1 will not be repeated here, and a difference between the two embodiments is that the proximal gathering member 112 described in Embodiment 1 can be disposed at the distal end of the first part 110 to be used as a distal gathering member 113, so that the features of their structures, the cooperation manner with the film member 117, the fixing manner in the gathering member, and the like are all the same or similar.

For example, the film member 117 of the first part 110 covers at least part of the outer surface of the distal disc face 115 of the first part 110, and the gathering region 118 of the film member 117 is at least partially fixed in the distal gathering member 113 of the first part 110. In other embodiments, the film member 117 on the first part 110 further covers the edge 116 of the first part 110. Further, in this embodiment, as shown in FIG. 12, the film member 117 on the first part 110 may also cover the distal disc face 114 of the first part 110, that is, the film member 117 covers the distal disc face 115, the edge 116, and the proximal disc face 114 of the first part 110.

Figure 12:
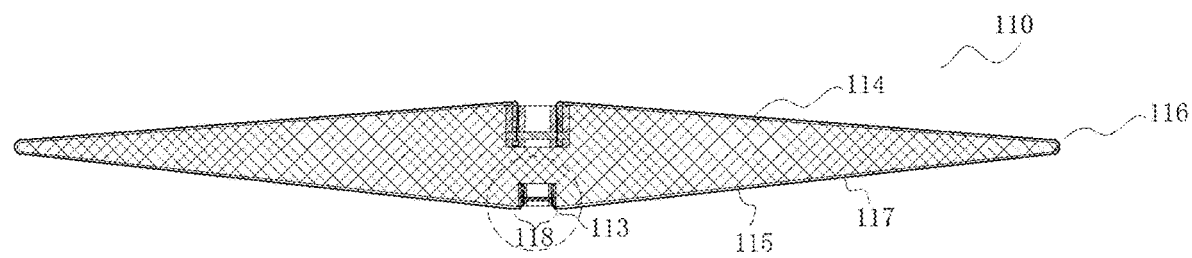
FIG. 12 is one schematic structural diagram of a first part in Embodiment 3.
Figure 13:
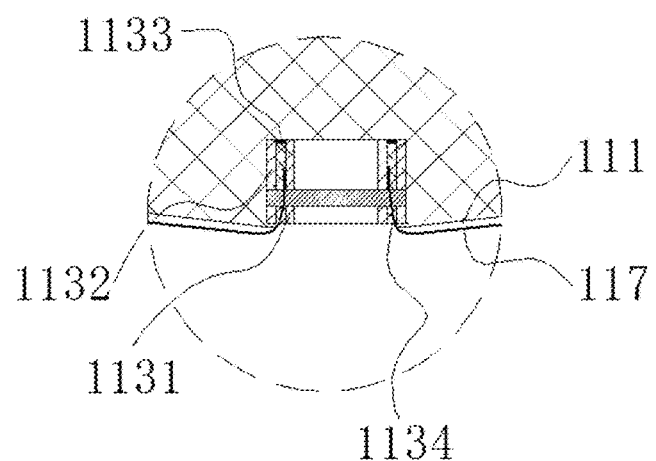
FIG. 13 is an enlarged schematic structural diagram of a round dotted line part in FIG. 12.

In some embodiments, referring to FIG. 12 and FIG. 13, the distal gathering member 113 of the first part 110 includes an inner sleeve 1131 and an outer sleeve 1132, both of which are sleeved from inside to outside; a proximal end part of the inner sleeve 1131 and a proximal end part of the outer sleeve 1132 are enclosed to form a proximal inlet 1133 of the proximal gathering member 113; a distal end part of the inner sleeve 1131 and a distal end part of the outer sleeve 1132 are enclosed to form a distal inlet 1134 of the proximal gathering member 113; and the distal ends of the plurality of braiding filaments 111 of the first part 110 are accommodated or fixed between the inner sleeve 1131 and the outer sleeve 1132 after passing through the distal inlet 1134 of the distal gathering member 113. In other embodiments, the distal ends of the plurality of braiding filaments 111 of the first part 110 are accommodated or fixed between the inner sleeve 1131 and the outer sleeve 1132 after passing through the proximal inlet 1133 of the distal gathering member 113.

For example, when the distal ends of the plurality of braiding filaments 111 of the first part 110 are received and fixed through the proximal inlet 1133 of the distal gathering member 113, the gathering region 118 of the film member 117 is at least partially accommodated or fixed between the inner sleeve 1131 and the outer sleeve 1132 via the proximal inlet 1133 or the distal inlet 1134 of the distal gathering member 113. When the distal ends of the plurality of braiding filaments 111 of the first part 110 are received and fixed through the distal inlet 1134 of the distal gathering member 113, the gathering region 118 of the film member 117 is at least partially accommodated or fixed between the inner sleeve 1131 and the outer sleeve 1132 via the distal inlet 1134 of the distal gathering member 113.

Embodiment 4

The same parts of the plugging device of Embodiment 4 as those of Embodiment 3 will not be repeated here. A difference between the two embodiments is that the distal gathering member 113 of the first part 110 described in Embodiment 3 can also be used for the distal gathering member 123 of the second part 120.

For example, the film member 124 of the second part 120 covers at least part of the outer surface of the distal disc face 128 of the second part 120, and the gathering region 125 of the film member 124 is at least partially fixed in the distal gathering member 123 of the second part 120. In the embodiment shown in FIG. 1, the film member 124 on the second part 120 can further cover the edge 127 of the second part 120, that is, a side portion between the proximal disc face 126 and the distal disc face 128 of the second part 120. Further, in other embodiments, the film member 124 on the second part 120 may further cover the distal disc face 126 of the second part 120, that is, the film member 124 covers the distal disc face 128, the edge 127, and the proximal disc face 126 of the second part 120. On this basis, the above-mentioned various specific structures of the distal gathering member 113 provided on the first part 110 in Embodiment 3, as well as the above-mentioned various specific manners for accommodating and fixing the distal ends of the plurality of braiding filaments and the gathering region 118 of the film member 117 are also applicable to the distal gathering member 123 on the second part 120, and details are not described here again.

Embodiment 5

Figure 14:
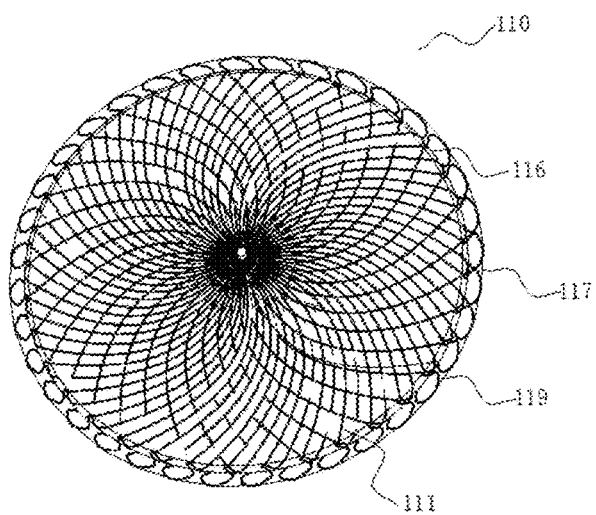
FIG. 14 is a schematic diagram of a spread structure of a proximal end of a first part in Embodiment 5.

The same parts of the plugging device of Embodiment 5 as those of Embodiments 1 to 4 will not be repeated here, and a difference is that, as shown in FIG. 14, the first part 110 further includes an extending member 119 located at the edge 116 of the first part 110. The film member 117 on the first part 110 also covers the extending member 119, and the extending member 119 radially outwardly dilates the film member 117 after being spread. In this embodiment, the extending member 119 is a plurality of semiring filaments disposed at the edge 116 of the first part 110, and two ends of the filaments are fixed at the edge 116 of the first part 110. The plurality of filaments may be uniformly distributed along the edge 116 of the first part 110. Further, two adjacent filaments may be spaced apart by a certain distance or abutted against each other. As one implementation, the filament may be formed after some of the plurality of braiding filaments 111 which are braided to form the first part 110 outwardly protrude from the edge 116 of the first part 110. In other implementations, the filament may be a separate component, two ends of which may be respectively fixed at appropriate positions on the edge 116 of the braided first part 110, so as to form a semiring. The extending member 119 may also have other shapes or structures, as long as the extending member 119 is spread to radially outwardly dilate the film member 117 when the first part 110 is released, so that the film member 117 is flatly spread on the outer surface of the first part 110 to avoid folds on the disc face, which easily causes thrombi.

In other embodiments, the above-mentioned extending member 119 may also be disposed on the edge 127 of the second part 120, and its structure and function are the same and will not be repeated here.

Embodiment 6

The same parts of the plugging device of Embodiment 6 as those of Embodiment 1 will not be repeated here. A difference between the two embodiments is that the gathering member in Embodiment 6 includes an inner sleeve, an intermediate sleeve, and an outer sleeve, all of which are hollow and are sleeved from inside to outside in turn. The gathering member relatively located at the proximal end of the first part 110 is referred to as a proximal gathering member 112, and the gathering member relatively located at the distal end of the first part 110 is referred to as a distal gathering member 123. The proximal ends of the plurality of braiding filaments 111 of the first part 110 and the gathering region 118 of the film member 117 are at least partially accommodated and fixed in the proximal gathering member 112 of the first part 110.

After the proximal ends of the plurality of braiding filaments 111 of the first part 110 are fixed between the outer sleeve and the intermediate sleeve, and the outer sleeve and the intermediate sleeve are also fixed together. By bulges and grooves, or cooperation between bulges and through holes, or various other manners, the inner sleeve and the outer sleeve can be directly or indirectly fixed together, or the inner sleeve and the intermediate sleeve can be directly or indirectly fixed together, thus forming the proximal gathering member 112 with a relatively stable structure. The specific structures and cooperation manners are not limited and will not be enumerated here.

The distal gathering member 113 of the first part 110 can also be a hollow sleeve, and the distal ends of the plurality of braiding filaments 111 are accommodated and fixed inside the sleeve. In another embodiment, the distal gathering member 113 of the first part 110 may also be of the same structure as that of the proximal gathering member 112 of the first part 110, that is, it includes an inner sleeve, an intermediate sleeve, and an outer sleeve, all of which are hollow and sleeved from inside to outside in turn. The distal ends of the plurality of braiding filaments 111 are accommodated and fixed between the inner sleeve and the intermediate sleeve, or the intermediate sleeve and the outer sleeve of the distal gathering member 113.

Figure 15:
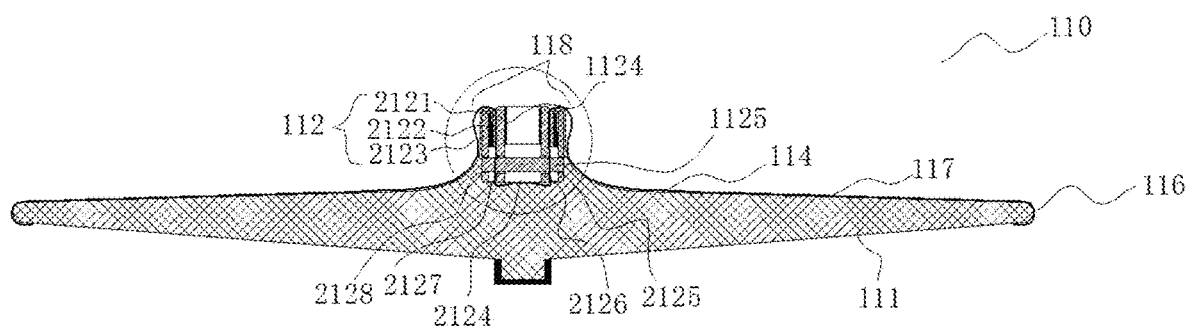
FIG. 15 is one schematic structural diagram of a first part in Embodiment 6.

As shown in FIG. 15, the proximal disc face 114 and the edge 116 of the first part 110 are wrapped with the film member 117, and there may be one or more layers of film members 117. A portion of the gathering region 118 of the film member 117 is fixed in the proximal gathering member 112 of the first part 110. For example, the portion is clamped between the inner sleeve 2121 and the intermediate sleeve 2122 of the proximal gathering member 112 for being fixed, thus ensuring that the proximal end of the first part 110 has enough good sealing performance. At the same time, the gathering region 118 of the film member 117 is firmly fixed through the proximal gathering member 112. Other portions of the film member 117 may be sutured to the proximal disc face 114 of the first part 110 by a suture or adhered to the proximal disc face 114 of the first part 110 by an adhesive. An edge of the film member 117 covers the edge 116 of the first part 110, which can reduce injury caused by the edge 116 of the first part 110 to the tissue in the body. The edge of the film member 117 can be fixed on the braiding filament 111 at the edge 116 by a suture or fixed at the edge 116 by being adhered by an adhesive. The proximal ends of the plurality of braiding filaments 111 on the first part 110 are fixed between the intermediate sleeve 2122 and the outer sleeve 2123 of the proximal gathering member 112, and the fixing way may be clamping the proximal ends by the intermediate sleeve 2122 and the outer sleeve 2123 for fixing, or may be fixing the proximal ends of the plurality of braiding filaments 111 between the intermediate sleeve 2122 and the outer sleeve 2123 in a manner of welding or other manners, or may be welding and fixing the proximal ends of the plurality of braiding filaments 111 at the distal end part of the outer sleeve 2123. The way of fixing is not limited.

The film member 117 can be an intact round film without obvious open pores 1171. After the film member 117 is sandwiched between the inner sleeve 2121 and the intermediate sleeve 2122 of the proximal gathering member 112; a distal opening 2124 of the inner sleeve 2121 is covered by a most central portion of the film member 117, thereby blocking the distal opening 2124 of the inner sleeve 2121 so as to prevent the blood flow from flowing into the first part 110 through the inner sleeve 2121, thereby improving the sealing performance of the plugging device.

Further, an inner wall of the inner sleeve 2121 of the proximal gathering member 112 of the first part 110 is provided with a thread 1124 or a fastener which can cooperate with a distal end of a delivery steel cable to realize detachable connection, so as to achieve the following purposes: when the proximal gathering member 112 of the first part 110 is connected to the delivery steel cable, delivering the plugging device, and when the connection is cut off, thoroughly releasing the plugging device and withdrawing the delivery steel cable. In other embodiments, the inner wall of the inner sleeve 2121 of the gathering member may not be provided with the thread 1124 or fastener.

In this embodiment, a portion of the proximal disc face 114 of the first part 110 that is close to the proximal gathering member 112 is similarly conical around the outer sleeve 2123, so that this portion is not perpendicular to the central axis of the proximal gathering member 112. In other embodiments, at least a portion of the proximal disc face 114 of the first part 110 that is close to the proximal gathering member 112 is perpendicular to the central axis of the proximal gathering member 112, thereby forming a relatively flat disc face near the proximal gathering member 112, so as to avoid the risk of thrombosis near the proximal gathering member 112 and improve the safety.

The proximal end part of the intermediate sleeve 2122 is flush with the proximal end part of the inner sleeve 2121 and the proximal end part of the outer sleeve 2123, and the distal end part of the outer sleeve 2123 is flush with the distal end part of the inner sleeve 2121. The length of the intermediate sleeve 2122 is less than that of the outer sleeve 2123 and that of the inner sleeve 2121. The proximal ends of the plurality of braiding filaments 111 are accommodated and fixed between the intermediate sleeve 2122 and the outer sleeve 2123. Positions of fixing points and the manner of fixing are not limited.

Further, a limiting member 1125 which radially extends or has an included angle from the central axis of the inner sleeve 2121 is arranged in the cavity of the inner sleeve 2121 of the proximal gathering member 112 of the first part 110. Two ends of the limiting member 1125 respectively penetrate through the sleeve wall of the inner sleeve 2121 so as to fix the limiting member 1125 to the inner sleeve 2121. The limiting member 1125 can be used to limit a depth of the delivery steel cable extending into the inner sleeve 2121 when the delivery steel cable is connected to the proximal gathering member 112, thus preventing the distal end of the delivery steel cable from poking the film member 117 located on a distal end face of the proximal gathering member 112, and can also be used to fix the film member 117 on the proximal gathering member 112 to further enhance the stability of the film member 117 in the proximal gathering member 112. The two ends of the limiting member 1125 further respectively penetrate through the sleeve wall of the outer sleeve 2123 so as to fix the limiting member 1125 to the outer sleeve 2123, thus connecting and relatively fixing the inner sleeve 2121 to the outer sleeve 2123.

In this embodiment, the limiting member 1125 is a plug that penetrates through the sleeve wall of the inner sleeve 2121 and the sleeve wall of the outer sleeve 2123 of the proximal gathering member 112. Two opposite through holes are formed in the sleeve wall of the inner sleeve 2121, and two opposite through holes are also formed in the sleeve wall of the outer sleeve 2123. One end of the plug passes through the through hole 2125 of the outer sleeve 2123, the through hole 2126 of the inner sleeve 2121, the through hole 2127 of the inner sleeve 2121, and the through hole 2128 of the outer sleeve 2123 from the outside to the inside in turn. Two ends of the plug are respectively finally accommodated and fixed in the two through holes 2125 and 2128 of the outer sleeve 2123. In other embodiments, the limiting member 1125 can also be other rodlike components, and the two ends of the limiting member 1125 can also extend out of the sleeve wall of the outer sleeve 2123. After the two ends of the limiting member 1125 extend out of the sleeve wall of the outer sleeve 2123, the limiting member 1125 is limited from moving in a radial direction by shape constraining. For example, the two ends of the limiting member 1125 are designed to be ball heads or bulges in other shapes, as long as an outer diameter of each bulge in an axial direction is greater than a diameter of the through holes, used to accommodate the limiting member 1125, on the sleeve wall of the outer sleeve 2123. In other embodiments, no limiting member 1125 may be provided in the proximal gathering member 112.

Figure 16:
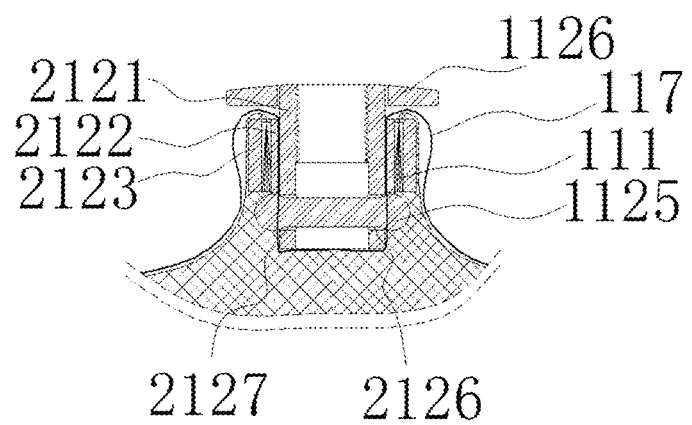
FIG. 16 is an enlarged schematic structural diagram of another implementation mode of the round dotted line part in FIG. 15.

In other embodiments, the limiting member 1125 only penetrates through the sleeve wall of the inner sleeve 2121, and the two ends of the limiting member 1125 are respectively accommodated and fixed in the two through holes 2126 and 2127 of the inner sleeve 2121. Further, in one embodiment, as shown in FIG. 16, the limiting member 1125 only penetrates through the sleeve wall of the inner sleeve 2121, and the two ends of the limiting member 1125 respectively extend out of the through holes 2126 and 2127 of the inner sleeve 2121 and are formed into ball heads by way of hot melting or the like, so as to clamp the inner sleeve 2121 between the two ball heads. At the same time, since the two ends of the limiting member 1125 respectively pass through the film member 117, the portion of the film member 117 close to the limiting member 1125 is also relatively fixed.

In other embodiments, the proximal end of the proximal gathering member 112 is provided with an end cap 1126 connected to the inner sleeve 2121, and the gathering region 118 of the film member 117 is at least partially accommodated or fixed between the end cap 1126 and the outer sleeve 2123, so as to further stably fix the film member 117 in the proximal gathering member 112. As one implementation mode, as shown in FIG. 16, the length of the outer sleeve 2123 is consistent with that of the intermediate sleeve 2122, and the length of the inner sleeve 2121 is greater than that of the outer sleeve 2123 and greater than that of the intermediate sleeve 2122. The proximal ends of the plurality of braiding filaments 111 on the first part 110 extend from a gap between the end cap 1126 and the outer sleeve 2123 into a gap between the intermediate sleeve 2122 and the outer sleeve 2123 until they extend to a distal end part of the intermediate sleeve 2122, and are then fixed at the distal end part of the intermediate sleeve 2122 and the distal end part of the outer sleeve 2123 in a manner of welding or other manners. In other embodiments, the end cap 1126 can further press the film member 117 to the outer sleeve 2123 and/or the intermediate sleeve 2122. In other embodiments, the distal end of the proximal gathering member 112 may also be provided with an end cap 1126 connected with the outer sleeve 2123 or the inner sleeve 2121, so as to further stably fix the film member 117 in the proximal gathering member 112, and the opening of the distal end of the proximal gathering member 112 can also be blocked to improve the sealing performance.

Figure 17:
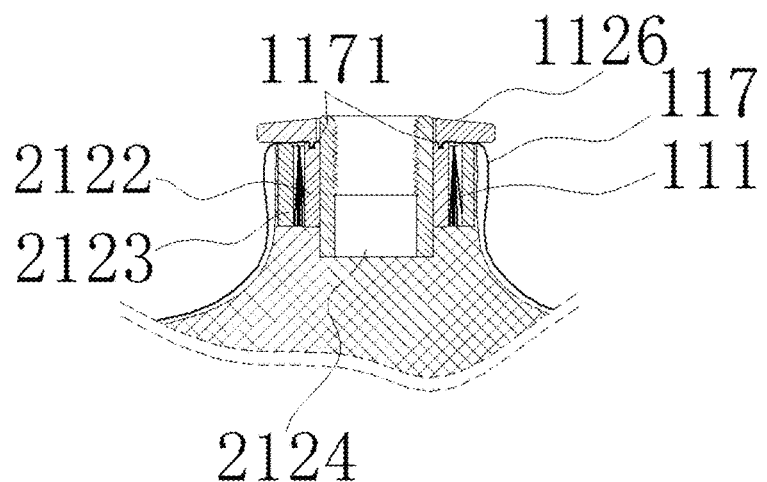
FIG. 17 is an enlarged schematic structural diagram of another implementation mode of the round dotted line part in FIG. 15.

In other embodiments, the gathering region 118 of the film member 117 is provided with an open pore 1171 as shown in FIG. 11, and a portion of the film member 117 that is enclosed to form the open pore 1171 is accommodated and fixed in the proximal gathering member 112. For example, as shown in FIG. 17, the portion of the film member 117 that is enclosed to form the open pore 1171 extends from the gap between the end cap 1126 and the outer sleeve 2123 and is fixed among the outer sleeve 2123, the intermediate sleeve 2122, and the end cap 1126. In other embodiments, the portion of the film member 117 that is enclosed to form the open pore 1171 may further extend between the inner sleeve 2121 and the intermediate sleeve 2122 or between the intermediate sleeve 2122 and the outer sleeve 2123, and is clamped or snapped between two adjacent sleeves in an annular or tubular manner, as long as it does not affect fixing the proximal ends of the plurality of braiding filaments 111 in the proximal gathering member 112. This film member 117 can be used in such a situation where the distal opening 2124 of the proximal gathering member 112 needs to be opened. In other embodiments, the limiting member 1125 or end cap 1126 may not be provided in the proximal gathering member 112, and the thread 1124 or fastener may not be provided in the inner sleeve 2121, either.

Figure 18:
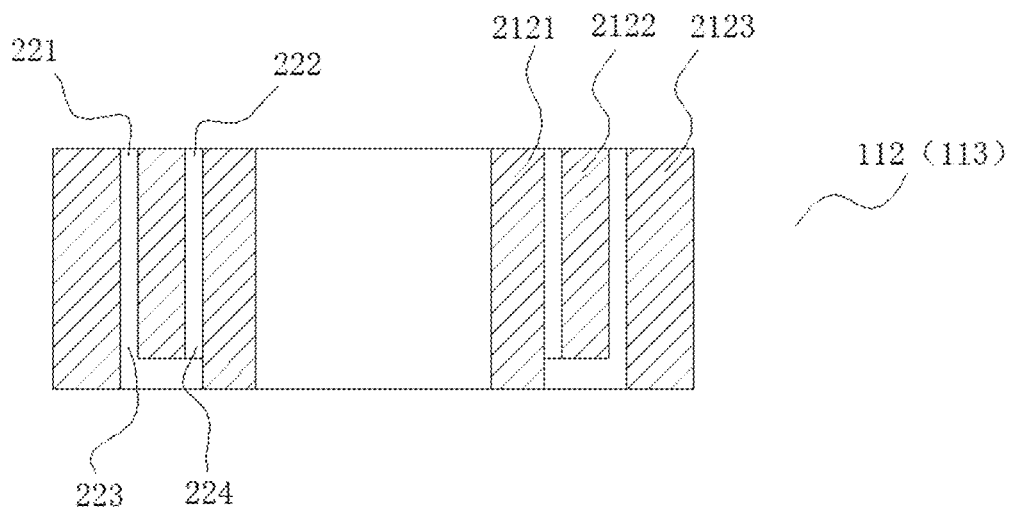
FIG. 18 is one schematic structural diagram of a gathering member in Embodiment 6.

As shown in FIG. 18, the proximal end part of the outer sleeve 2123 and the proximal end part of the intermediate sleeve 2122 are enclosed to form an outer side proximal inlet 221 of the proximal gathering member 112, and the proximal end part of the intermediate sleeve 2122 and the proximal end part of the inner sleeve 2121 are enclosed to form an inner side proximal inlet 222 of the proximal gathering member 112; the distal end part of the outer sleeve 2123 and a distal end part of the intermediate sleeve 2122 are enclosed to form an outer side distal inlet 223 of the proximal gathering member 112; and the distal end part of the intermediate sleeve 2122 and the distal end part of the inner sleeve 2121 are enclosed to form an inner side distal inlet 224 of the proximal gathering member 112. As shown in FIG. 15 to FIG. 17, the proximal ends of the plurality of braiding filaments 111 of the first part 110 are accommodated or fixed between the outer sleeve 2123 and the intermediate sleeve 2122. In other embodiments, the proximal ends of the plurality of braiding filaments 111 of the first part 110 are accommodated or fixed between the intermediate sleeve 2122 and the inner sleeve 2121. For example, the proximal ends of the plurality of braiding filaments 111 of the first part 110 are accommodated or fixed in the proximal gathering member 112 after passing through one of the outer side proximal inlet 221, the outer side distal inlet 223, and the inner side distal inlet 224 of the proximal gathering member 112.

As some embodiments, when the proximal ends of the plurality of braiding filaments 111 of the first part 110 are received and fixed through the outer side proximal inlet 221 of the proximal gathering member 112, the gathering region 118 of the film member 117 is at least partially fixed between the inner sleeve 2121 and the intermediate sleeve 2122 via the inner side proximal inlet 222 of the proximal gathering member 112, or is at least partially fixed among the outer sleeve 2123, the intermediate sleeve 2122, and the end cap 1126. When the proximal ends of the plurality of braiding filaments 111 of the first part 110 are received and fixed through the outer side distal inlet 223 of the proximal gathering member 112, the gathering region 118 of the film member 117 is at least partially accommodated or fixed between two adjacent sleeves via the outer side proximal inlet 221 or the inner side proximal inlet 222 of the proximal gathering member 112, or is at least partially fixed among the outer sleeve 2123, the intermediate sleeve 2122, and the end cap 1126. When the proximal ends of the plurality of braiding filaments 111 of the first part 110 are received and fixed through the inner side distal inlet 224 of the proximal gathering member 112, the gathering region 118 of the film member 117 is at least partially accommodated or fixed between the inner sleeve 2121 and the outer sleeve 2123 via any one of the outer side proximal inlet 221, the inner side proximal inlet 222, and the outer side distal inlet 223 of the proximal gathering member 112, or is at least partially fixed among the outer sleeve 2123, the intermediate sleeve 2122, and the end cap 1126.

In other embodiments, at least one layer of blow blocking film is further arranged inside the first part 110 and is used to prevent blood from flowing into the first part 110 from the proximal disc face 114 of the first part 110, thereby further improving the occlusion performance of the first part 110.

Embodiment 7

The same parts of the plugging device of Embodiment 7 as those of Embodiment 6 will not be repeated here. A difference between the two embodiments is that the proximal gathering member 112 or the distal gathering member 113 of the first part 110 described in Embodiment 6 can also be used for the proximal gathering member 122 or the distal gathering member 123 of the second part 120.

For example, the film member 124 of the second part 120 covers at least part of the outer surface of the proximal disc face 126 of the second part 120, and the gathering region 125 of the film member 124 is at least partially fixed in the proximal gathering member 122 of the second part 120. In other embodiments, the film member 124 on the second part 120 can further cover the edge 127 of the second part 120, that is, a side portion between the proximal disc face 126 and the distal disc face 128 of the second part 120. Further, in other embodiments, the film member 124 on the second part 120 may further cover the distal disc face 128 of the second part 120, that is, the film member 124 covers the proximal disc face 126, the edge 127, and the distal disc face 128 of the second part 120. On this basis, the above-mentioned various specific structures of the proximal gathering member 112 provided on the first part 110 in Embodiment 6, as well as the above-mentioned various specific manners for accommodating and fixing the proximal ends of the plurality of braiding filaments 111 and the gathering region 118 of the film member 117 are also applicable to the proximal gathering member 122 on the second part 120, and details are not described here again.

Embodiment 8

The same parts of the plugging device of Embodiment 8 as those of Embodiment 6 will not be repeated here, and a difference between the two embodiments is that the proximal gathering member 112 described in Embodiment 6 can be disposed at the distal end of the first part 110 to be used as a distal gathering member 113, so that the features of their structures, the cooperation manner with the film member 117, the fixing manner in the gathering member, and the like are all the same or similar.

For example, the film member 117 of the first part 110 covers at least part of the outer surface of the distal disc face 115 of the first part 110, and the gathering region 118 of the film member 117 is at least partially fixed in the distal gathering member 113 of the first part 110. In other embodiments, the film member 117 on the first part 110 may further cover the edge 116 of the first part 110. Further, the film member 117 on the first part 110 may further cover the proximal disc face 114 of the first part 110, that is, the film member 117 covers the distal disc face 115, the edge 116, and the proximal disc face 114 of the first part 110.

As shown in FIG. 18, the distal gathering member 113 of the first part 110 includes an inner sleeve 2121, an intermediate sleeve 2122, and an outer sleeve 2123, all of which are hollow and sleeved from inside to outside in turn. The proximal end part of the outer sleeve 2123 and the proximal end part of the intermediate sleeve 2122 are enclosed to form an outer side proximal inlet 221 of the distal gathering member 113, and the proximal end part of the intermediate sleeve 2122 and the proximal end part of the inner sleeve 2121 are enclosed to form an inner side proximal inlet 222 of the distal gathering member 113; the distal end part of the outer sleeve 2123 and a distal end part of the intermediate sleeve 2122 are enclosed to form an outer side distal inlet 223 of the distal gathering member 113; and the distal end part of the intermediate sleeve 2122 and the distal end part of the inner sleeve 2121 are enclosed to form an inner side distal inlet 224 of the distal gathering member 113. The distal ends of the plurality of braiding filaments 111 of the first part 110 are accommodated or fixed in the distal gathering member 113 after passing through one of the outer side proximal inlet 221, the outer side distal inlet 222, and the inner side distal inlet 223 of the distal gathering member 113.

In some embodiments, when the distal ends of the plurality of braiding filaments 111 of the first part 110 are received and fixed through the outer side proximal inlet 221 of the distal gathering member 113, the gathering region 118 of the film member 117 is at least partially accommodated or fixed between two adjacent sleeves via the outer side distal inlet 223 or the inner side distal inlet 224 of the distal gathering member 113. When the distal ends of the plurality of braiding filaments 111 of the first part 110 are received and fixed through the inner side proximal inlet 222 of the distal gathering member 113, the gathering region 118 of the film member 117 is at least partially accommodated or fixed between two adjacent sleeves via any one of the outer side proximal inlet 221, the outer side distal inlet 223, and the inner side distal inlet 224 of the distal gathering member 113. When the distal ends of the plurality of braiding filaments 111 of the first part 110 are received and fixed through the outer side distal inlet 223 of the distal gathering member 113, the gathering region 118 of the film member 117 is at least partially accommodated or fixed between the inner sleeve 2121 and the intermediate sleeve 2122 via the inner side distal inlet 224 of the distal gathering member 113.

Embodiment 9

The same parts of the plugging device of Embodiment 9 as those of Embodiment 8 will not be repeated here. A difference between the two embodiments is that the distal gathering member 113 of the first part 110 described in Embodiment 8 can also be used for the distal gathering member 123 of the second part 120.

For example, the film member 124 of the second part 120 covers at least part of the outer surface of the distal disc face 128 of the second part 120, and the gathering region 125 of the film member 124 is at least partially fixed in the distal gathering member 123 of the second part 120. In other embodiments, the film member 124 on the second part 120 can further cover the edge 127 of the second part 120, that is, a side portion between the proximal disc face 126 and the distal disc face 128 of the second part 120. Further, in other embodiments, the film member 124 on the second part 120 may further cover the distal disc face 126 of the second part 120, that is, the film member 124 covers the distal disc face 128, the edge 127, and the proximal disc face 126 of the second part 120. On this basis, the above-mentioned various specific structures of the distal gathering member 113 provided on the first part 110 in Embodiment 8, as well as the above-mentioned various specific manners for accommodating and fixing the distal ends of the plurality of braiding filaments 111 and the gathering region 118 of the film member 117 are also applicable to the distal gathering member 123 on the second part 120, and details are not described here again.

It should be noted that in other embodiments, the relevant features, described in Embodiment 5, of the extending member 119 arranged at the edge 116 of the first part 110 or the edge 127 of the second part 120 are also applicable to Embodiment 6 to Embodiment 9, and will not be repeated here.

Embodiment 10

In the existing occluder, a sealing plate used to occlude an opening in the body is generally woven into a mesh tube by braiding filaments, and two ends of the mesh tube need to be closed and fixed by a bolt head. After the bolt head closes one end of each braiding filament, it often protrudes from the disc face of the sealing plate, so when the disc face and the bolt head are exposed to blood flow, it is easy to form a thrombus at the bolt head. After the thrombus flows into the human brain with the blood flow, it easily blocks a blood vessel, induces stroke, and endanger human health.

In view of this, this embodiment provides a new, highly safe plugging device for the problem that a thrombus is easily formed due to the fact that the bolt head protrudes from the disc face of the sealing plate in the existing plugging device, so that the plugging device can be more safely serve patients.

Figure 19:
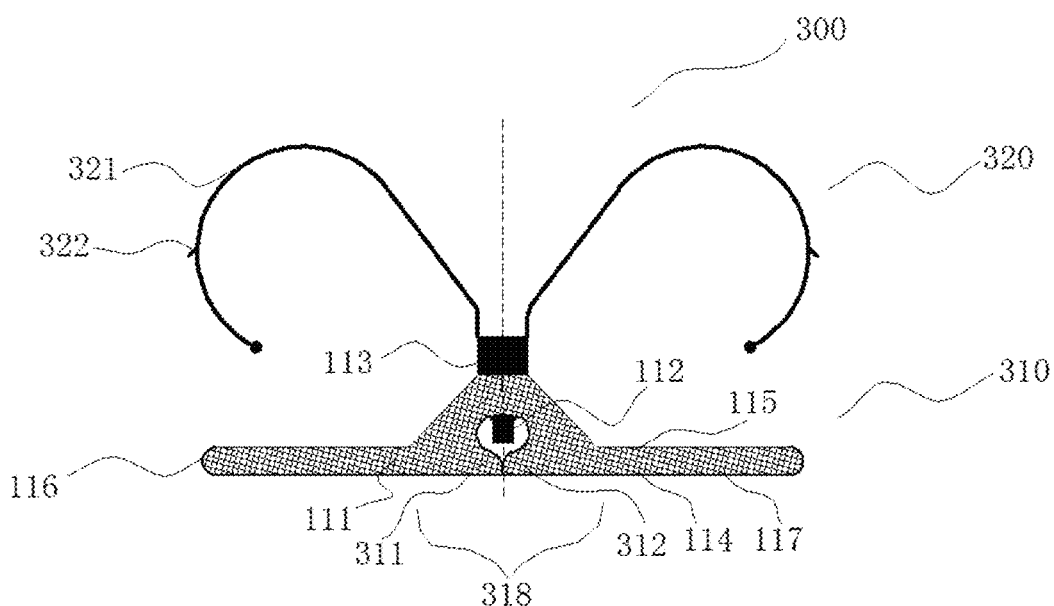
FIG. 19 is one schematic diagram of an entire structure of a plugging device in Embodiment 10.

The plugging device 300 of Embodiment 10, as shown in FIG. 19, includes a first part 310, and a second part 320 connected to the first part 310. The first part 310 includes a plurality of braiding filaments 111 and a gathering member (i.e., the proximal gathering member 112) relatively located at a proximal end. Proximal ends of the plurality of braiding filaments 111 are accommodated and fixed in the proximal gathering member 112, so that the proximal ends of the plurality of braiding filaments 111 are fixed to the proximal gathering member 112. The first part 310 further includes a gathering member (i.e., the distal gathering member 113) relatively located at a distal end. Distal ends of the plurality of braiding filaments 111 are accommodated and fixed in the distal gathering member 113, so that the distal ends of the plurality of braiding filaments 111 are fixed to the distal gathering member 113.

The plurality of braiding filaments 111 of the first part 310 can be braided to form a mesh tube and can be shaped like a disc or a column after heat setting. The first part 310 in a spread state includes a proximal disc face 114 and a distal disc face 115. The proximal disc face 114 of the first part 310 is formed by the cooperation of at least some of the plurality of braiding filaments 111 of the first part 310 that are relatively located at the proximal ends. The distal disc face 115 of the first part 310 is formed by the cooperation of at least some of the plurality of braiding filaments 111 of the first part 310 that are relatively located at the distal ends. A portion, where the proximal disc face 114 and the distal disc face 115 are connected, of the first part 310 form an edge 116 of the first part 310.

The proximal gathering member 112 of the first part 310 may be a hollow sleeve, may also be a two-layer sleeve composed of an inner sleeve 1121 and an outer sleeve 1122 as described in any of the above embodiments, or may be a three-layer sleeve composed of an inner sleeve 2121, an intermediate sleeve 2122, and an outer sleeve 2123. Its features such as the structure and the manner of gathering the braiding filaments 111 are the same or similar and will not be repeated here. The structure of the distal gathering member 113 of the first part 310 is not limited. It can be any one of the aforementioned hollow sleeve, two-layer sleeve, and three-layer sleeve.

In this embodiment, the distal gathering member 113 of the first part 310 is directly connected to the proximal end of the second part 320, without a connector between the first part 310 and the second part 320. The second part 320 includes a plurality of support rods 321, and the proximal ends of the support rods 321 are fixed on the distal end gathering member 113 of the first part 310. The support rods 321 are provided with anchor thorns 322, which are used to improve the anchoring stability of the second part 320 after they are punctured into a tissue in the body. In other embodiments, the distal gathering member 113 of the first part 310 may be disposed in the proximal gathering member of the second part 320 and is fixedly connected, thereby connecting the first part 310 to the second part 320. The structure of the second part 320 is not limited. The second part can also be the second part 120 described in Embodiment 1 in other embodiments.

The gathering region 318 of the first part 310 refers to a portion close to a central axis of the first part 310 along a radial direction of the first part 310, and a covered region may be a region which takes the central axis of the first part 310 as a center and has a radius in a range of ¼ to ½ of a radius of the first part 310. The gathering region 318 of the first part 310 includes a gathering portion formed by some of the plurality of braiding filaments 111 by shape convergence. In one implementation mode of this embodiment, the gathering portion includes a first gathering portion 311 and a second gathering portion 312, and part of an outer surface of the gathering portion forms a portion of the proximal disc face 114. The first gathering portion 311 and the second gathering portion 312 are close to each other without an external force, so as to encircle the proximal gathering member 112 of the first part 310 in a space located in the first part 310 and enclosed by the first gathering portion 311 and the second gathering portion 312. Thus, the risk of thrombosis at the proximal gathering member 112 since the proximal gathering member 112 of the first part 310 is closer to the proximal end than the proximal disc face 114, that is, the proximal gathering member 112 protrudes from the proximal disc face 114 toward the proximal end is avoided.

Figure 20A:
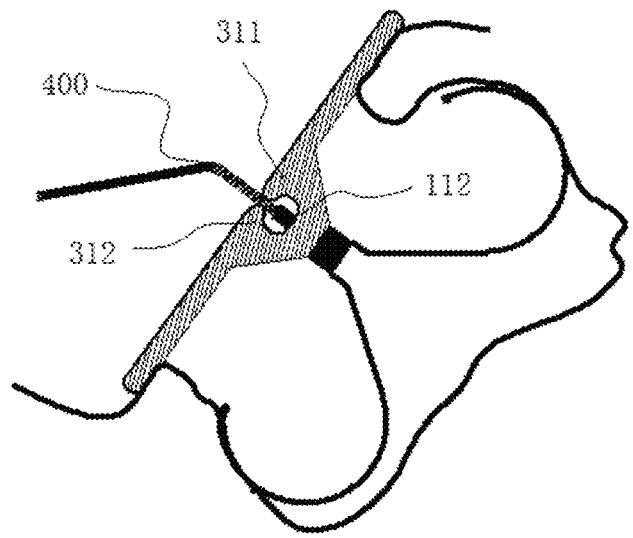
FIG. 20A is a schematic structural diagram illustrating that the plugging device in Embodiment 10 is implanted into the body and is connected to a delivery steel cable.
Figure 20B:
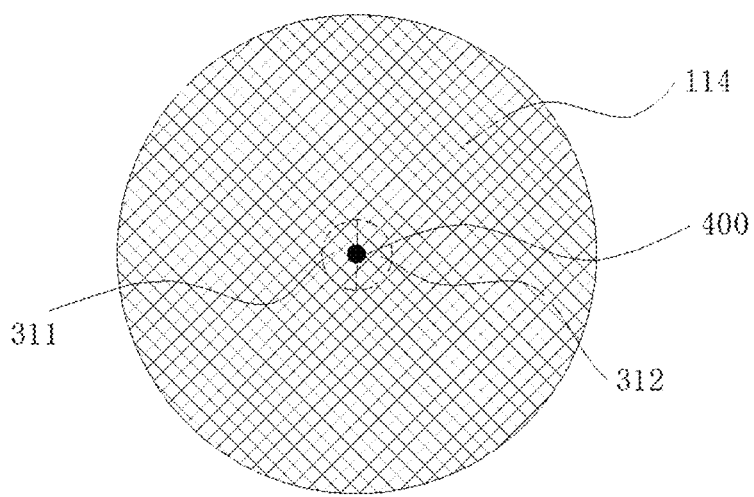
FIG. 20B is a schematic diagram of a longitudinal section of a first part in FIG. 20A.

As one implementation mode, when the plugging device 300 is connected to a distal end of a delivery steel cable and accommodated in a sheath tube together, and is then implanted into a cavity of a tissue in the body such as the left atrial appendage; the sheath tube is withdrawn towards the proximal end, so that the plugging device 300 self-expands after the radial constraint applied by the sheath tube is relieved, and is released. After the first part 310 is released, as one implementation mode, an edge portion of the distal disc face 115 of the first part is abutted against the tissue at the opening of the left atrial appendage, thereby occluding the opening of the left atrial appendage. Referring to FIG. 19 and FIG. 20A, after the sheath tube (not shown) is withdrawn, when the delivery steel cable 400 has not been disconnected from the plugging device 300, the distal end of the delivery steel cable 400 is still connected to the proximal end receiving member 112 of the first part 310. The connection manner can be threaded connection, which is not limited here. At this time, the first gathering portion 311 and the second gathering portion 312 are away from each other under the action of an external force provided by the distal end part of the delivery steel cable 400. For example, portions, opposite by taking the distal end part of the delivery steel cable 400 as a center, of the first gathering portion 311 and the second gathering portion 312 are abutted with the distal end part of the delivery steel cable 400. FIG. 20B illustrates a sectional view seen from the proximal end to the distal end.

Figure 21A:
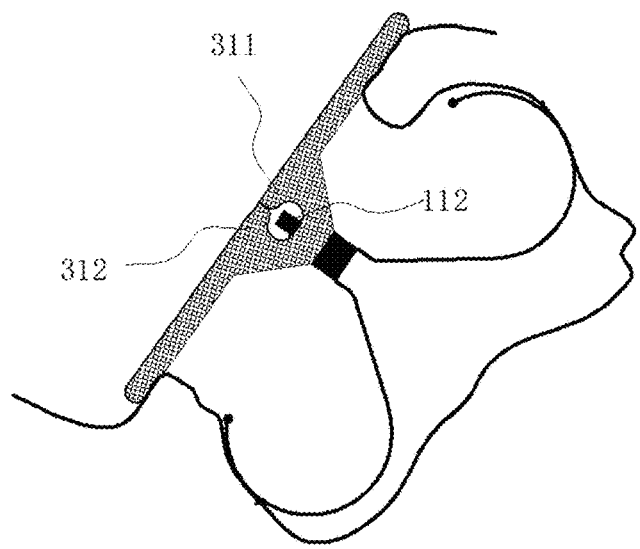
FIG. 21A is a schematic structural diagram illustrating that the plugging device in Embodiment 10 is implanted into the body and is separated from a delivery steel cable.
Figure 21B:
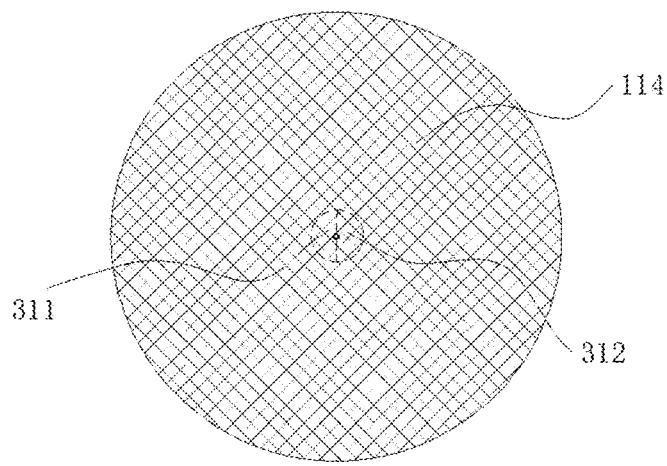
FIG. 21B is a schematic diagram of a longitudinal section of a first part in FIG. 21A.

Referring to FIG. 19 and FIG. 21A, after the distal end of the delivery steel cable 400 is disconnected from the proximal gathering member 112 of the first part 310, the first gathering portion 311 and the second gathering portion 312 are close to each other since they lose the external force of the distal end part of the delivery steel cable 400. FIG. 21B illustrates a sectional view seen from the proximal end to the distal end. The proximal disc face 114 is approximately sealed after the first gathering portion 311 and the second gathering portion 312 are close to each other, so that the proximal gathering member 112 of the first part 310 is encircled in a space enclosed by the first gathering portion 311 and the second gathering portion 312 in the first part 310. For example, the proximal gathering member is encircled between the proximal disc face 114 and the distal disc face 115 of the first part 310. At this time, the proximal disc face 114 is flat and sealed, so after the plugging device 300 is completely released, under the continuous scouring of the blood flow, it is not easy to form a thrombus at the proximal disc face 114 of the first part 310, which improves the safety of the operation.

It should be noted that, referring to FIG. 21B, there may be a small gap (a small hole in the center in FIG. 21B) after the first gathering portion 311 and the second gathering portion 312 are close to each other, and the maximum outer diameter of the gap is less than or equal to 5 mm, for example less than or equal to 3 mm. In an actual design, the size of the gap is generally smaller than the size of a mesh hole of the braided mesh formed by the plurality of braiding filaments 111 or smaller than an inner diameter of the above-mentioned inner sleeve. Even if there is still a gap after the first gathering portion 311 and the second gathering portion 312 are close to each other, thrombosis will not be induced, which is equivalent that the proximal disc face 114 formed by the cooperation of partial outer surfaces of the first gathering portion 311 and the second gathering portion 312 is still sealed.

In another embodiment, if there is still a gap after the first gathering portion 311 and the second gathering portion 312 are close to each other, a sealing member may be arranged at the gap, so that the proximal disc face 114 formed by the cooperation of the first gathering portion 311 and the second gathering portion 312 is sealed. The sealing member may be a jelly such as an embolizing agent which has the characteristic that the jelly has a relatively stable shape after solidification and is not easily permeated by liquid. After the delivery steel cable 400 is disconnected from the first part 310, the embolizing agent can be injected into the space enclosed by the first gathering portion 311 and the second gathering portion 312, thereby filling the space and ensuring that the proximal disc face 114 is sealed. The sealing member may also be a compressible and self-expandable cover connected to the first part 310, so that the gap can be covered after the cover is spread, and that the proximal disc face 114 is sealed is ensured. The sealing member may also be a component of other structures, and the structure is not limited, as long as the proximal disc face 114 can be sealed which will not be enumerated here. In addition, after the blood flow passes through the gap and enters the space enclosed by the gathering portions, thrombosis easily occurs. It is difficult for the formed thrombus to overflow from the gap, and the thrombus will stably exist in the space, thereby filling the space and sealing the disc face.

In other embodiments, the shapes and number of the gathering portions, and arrangement positions of the gathering portions on the first part 310 are not limited, as long as the gathering portions can encircle the proximal gathering member 112 or the distal gathering member 113 on the inner side of the first part 310 in a natural state or after the external force is withdrawn, thus avoiding the risk that the proximal gathering member 112 or the distal gathering member 113 protrudes from the first part 310 and easily induces thrombosis. In addition, since the gathering portions surrounding the proximal gathering member 112 or the distal gathering member 113 cooperate to form the flat and sealed disc face, the risk of thrombosis easily induced on the outer side of the first part 310 can be completely avoided. It can be understood that the relevant features of the gathering portion provided on the first part 310 can also be applied to the second part 320.

The plugging device 300 also includes one or more layers of film members 117 arranged on the first part 310. As shown in FIG. 19, the film member 117 covers the proximal disc face 114 and the edge 116 of the first part 310, so that the film member 117 also covers the outer surface of the first gathering portion 311 and the outer surface of the second gathering portion 312. The gathering region of the film member 117 is at least partially accommodated or fixed within the proximal gathering member 112 of the first part 310. It should be noted that the related features of the film member 117 in this embodiment are the same as or similar to the related features of the film member 117 in Embodiment 1 and will not be repeated here. The film member 117 provided on the first part 310 can further improve the sealing performance of the first part and achieve multi-layer occlusion. In other embodiments, the film member 117 may not be provided on the first part 310, as long as the first gathering portion 311 and the second gathering portion 312 cooperate with each other to form the flat proximal disc face 114, so that the thrombosis at the proximal disc face 114 can be avoided. In other embodiments, the film member 117 covers part of the outer surface of the first gathering portion 311 or covers part of the outer surface of the second gathering portion 312, or covers part of the respective outer surfaces of the first gathering portion 311 and the second gathering portion 312.

Figure 22:
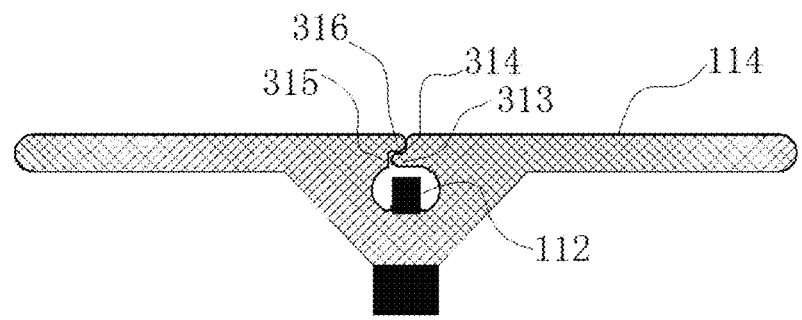
FIG. 22 is another schematic structural diagram of a first part in Embodiment 10.

The shapes of the first gathering portion 311 and the second gathering portion 312 are not limited, as long as the formed proximal disc face 114 is sealed and has a fat surface after the gathering portions are close to each other. In other embodiments, as shown in FIG. 22, the first gathering portion 311 includes one bulge 313 and one recess 314, and the second gathering portion 312 includes one recess 315 and one bulge 316; after the first gathering portion 311 and the second gathering portion 312 are close to each other, the bulge 313 of the first gathering portion 311 is abutted against the recess 315 of the second gathering portion 312, and the recess 314 of the first gathering portion 311 is abutted against the bulge 316 of the second gathering portion 312. Thus, the first gathering portion 311 and the second gathering portion 312 can be fitted more fully and more easily form the flat proximal disc face 114 to avoid the thrombosis at the proximal disc face 114. In another embodiment, the first gathering portion 311 includes a plurality of bulges 313 and a plurality of recesses 314, and the second gathering portion 312 includes a plurality of recesses 315 and a plurality of bulges 316; after the first gathering portion 311 and the second gathering portion 312 are close to each other, the plurality of bulges 313 of the first gathering portion 311 are respectively abutted against one recess 315 of the second gathering portion 312, and the plurality of recesses 314 of the first gathering portion 311 are respectively abutted against one bulge 316 of the second gathering portion 312. Therefore, after the first gathering portion 311 is abutted against the second gathering portion 312, the proximal disc face 114 of the first part 310 is sealed, and the proximal gathering member 112 of the first part 310 is sealed inside the first part 310, without contacting blood, thus avoiding the thrombosis. In these embodiments, the first gathering portion 311 and the second gathering portion 312 partially overlap in an axial direction and also partially overlap in a radial direction. In order to ensure that the formed proximal disc face 114 is sealed, after the first gathering portion 311 and the second gathering portion 312 are close to each other, they are at least fitted to each other in the radial direction. In other embodiments, there may be a plurality of bulges 313 of the first gathering portion 311 being abutted against one recess 315 of the second gathering portion 312, which also enables the first gathering portion 311 and the second gathering portion 312 to be abutted against each other.

Figure 23:
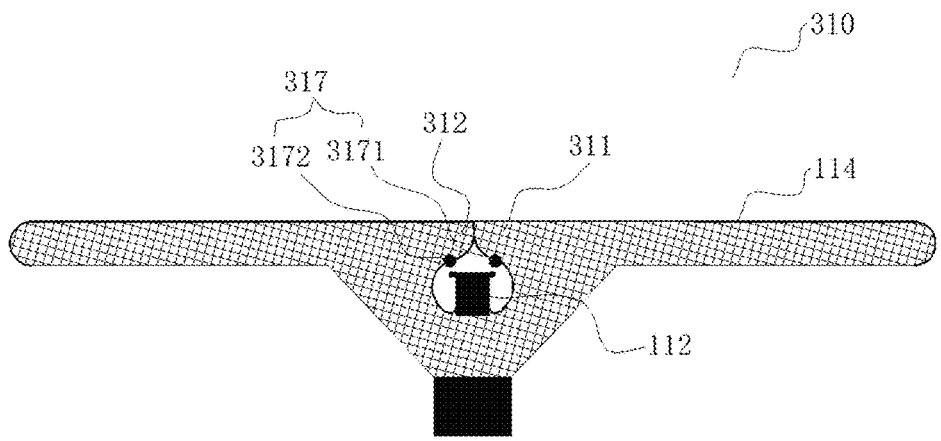
FIG. 23 is another schematic structural diagram of a first part in Embodiment 10.

Further, in other embodiments, the first part 310 is further provided with a reset member. After the external force on the first gathering portion 311 and the second gathering portion 312 is withdrawn, the reset member gathers the first gathering portion 311 and the second gathering portion 312. In one implementation mode, as shown in FIG. 23, the reset member 317 includes a magnet 3171 and a magnet 3172 having opposite magnetisms. The magnet 3171 is arranged on the first gathering portion 311, and the magnet 3172 is arranged on the second gathering portion 312. The number and arrangement positions of magnets with the same magnetism are not limited. For example, magnets can also be arranged on the proximal gathering member 112 of the first part 310, so as to attract the magnets arranged on the first gathering portion 311 and/or the second gathering portion 312. The first gathering portion 311 and the second gathering portion 312 are then gathered together under the action of mutual attraction of the two kinds of magnets after the acting force of the delivery steel cable 400 on two gathering portions is relieved, so as to promote the first gathering portion 311 and the second gathering portion 312 to be close to each other and eventually form the sealed proximal disc face 114.

Figure 24:
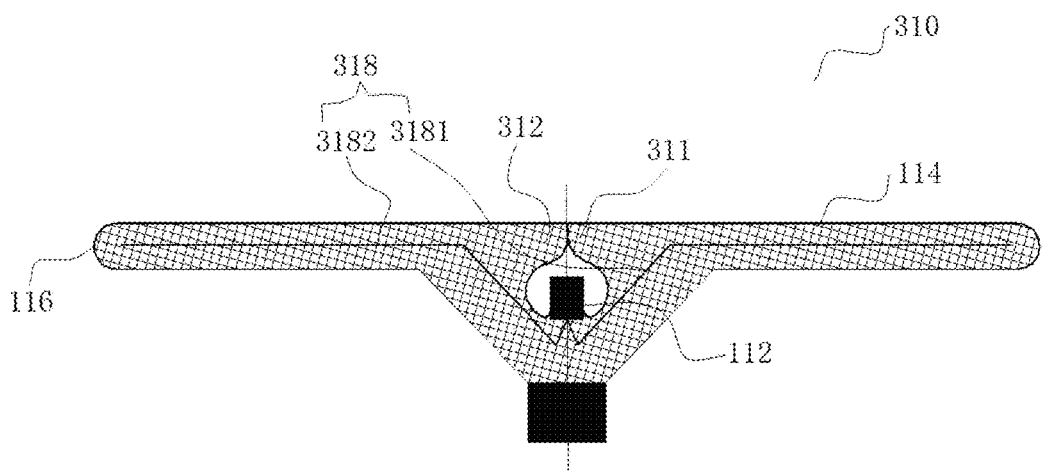
FIG. 24 is another schematic structural diagram of a first part in Embodiment 10.

In another implementation mode as shown in FIG. 24, the reset member 318 includes a first reset rod 3181 arranged close to the first gathering portion 311 and a second reset rod 3182 arranged close to the second gathering portion 312; and the first gathering portion 311 and the second gathering portion 312 are gathered to each other under the action of the first reset rod 3181 and the second reset rod 3182. For example, one end of the first reset rod 3181 is fixed at the distal end of the proximal gathering member 112 of the first part 310, and the other end extends from the distal end of the proximal gathering member 112 toward the proximal disc face 114, and radially outwardly extends a certain distance at a position close to the proximal disc face 114, and does not extend out of the edge 116 of the first part 310; and the second reset rod 3182 is symmetric with the first reset rod 3181 about the proximal gathering member 112 serving as a center. In another implementation mode, the first reset rod 3181 and the second reset rod 3182 are symmetrically arranged. One end of the first reset rod 3181 is fixed at the distal end of the proximal gathering member 112, and the other end extends in a bending manner from the distal end of the proximal gathering member 112 toward the first gathering portion 311; and one end of the second reset rod 3182 is fixed at the distal end of the proximal gathering member 112, and the other end extends in a bending manner from the distal end of the proximal gathering member 112 toward the second gathering portion 312. In these embodiments, when the first part 310 is accommodated in the sheath tube, the first reset rod 3181 and the second reset rod 3182 both conform to the deformation of the first part 310 to be approximately linear, and can recover the above shape after the first part 310 gets rid of the constraint of the sheath tube, so as to promote the first gathering portion 311 and the second gathering portion 312 to be close to each other and finally form the sealed proximal disc face 114.

Figure 25:
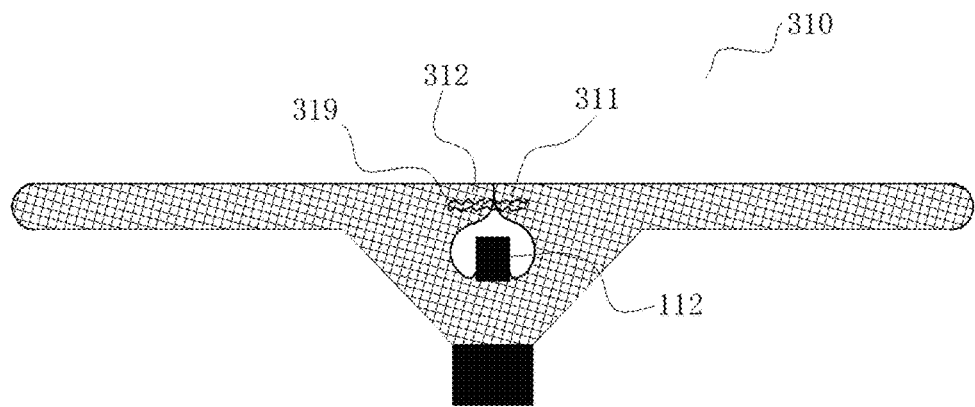
FIG. 25 is another schematic structural diagram of a first part in Embodiment 10.

In another implementation mode, as shown in FIG. 25, the reset member 319 includes an elastic coil connecting the first gathering portion 311 with the second gathering portion 312. The elastic coil has good elasticity and can be radially outwardly dilated when the delivery steel cable 400 is connected to the proximal gathering member 112, so as not to block the connection, nor to hinder the separation of first gathering portion 311 from the second gathering portion 312. After the delivery steel cable 400 is disconnected from the proximal gathering member 112, the first gathering portion 311 and the second gathering portion 312 can be gathered together under the contraction of the elastic coil. One or more of such elastic coils can be provided as required.

In some other embodiments, all the features described in any of the foregoing Embodiments 1 to 9 may be correspondingly included, that is, the foregoing features of the first part 310 described in Embodiment 10 can be regarded as a continuation on the basis of any of the foregoing Embodiments 1 to 9, and the same parts will not be repeated here.

The features of the embodiments described above can be arbitrarily combined. In order to make the description of the embodiments concise, all possible combinations of various features in the embodiments are not completely described. However, the combinations of these features should be considered as the scope described in the embodiments.

The embodiments only express several implementation modes, and their descriptions are more specific and detailed, but they cannot be understood or interpreted. It should be noted that those of ordinary skill in the art can further make various transformations and improvements without departing from the scope of the embodiments, and these transformations and improvements all fall within the scope of the present embodiments.

The invention claimed is:

1. A plugging device, comprising: a first part, and a second part connected to the first part, wherein the first part or the second part comprises a plurality of braiding filaments and a gathering member; portions of the braiding filaments that are proximate to one ends of the braiding filaments cooperate to form a disc face; the plugging device further comprises a film member; the film member at least covers part of an outer surface of the disc face; the gathering member comprises an inner sleeve and an outer sleeve, both the inner sleeve and outer sleeve are hollow and sleeved; and one end of each braiding filament and at least part of a gathering region of the film member are all fixed to the gathering member;

wherein an open pore is formed in the gathering region of the film member, and a portion of the film member that is enclosed to form the open pore is accommodated and fixed in the gathering member.

2. The plugging device according to claim 1, wherein one end of the gathering member is provided with an end cap connected to the inner sleeve; and the gathering region of the film member is at least partially accommodated or fixed between the end cap and the outer sleeve.

3. The plugging device according to claim 1, wherein at least a portion of the disc face that is proximate to the gathering member is perpendicular to a central axis of the gathering member.

4. The plugging device according to claim 1, wherein a thread or a clamping member is arranged on an inner wall of the inner sleeve.

5. The plugging device according to claim 1, wherein a limiting member which radially extends or has an included angle from a central axis of the inner sleeve is arranged in a cavity of the inner sleeve.

6. The plugging device according to claim 1, wherein the first part or the second part further comprises an extending member located at an edge of the first part or the second part; the film member further covers the extending member; and the extending member radially outwardly dilates the film member after being spread.

7. The plugging device according to claim 1, wherein a proximal end part of the inner sleeve and a proximal end part of the outer sleeve are enclosed to form a proximal inlet of the gathering member; a distal end part of the inner sleeve and a distal end part of the outer sleeve are enclosed to form a distal inlet of the gathering member; and one end of each of the plurality of braiding filaments is fixed between the inner sleeve and the outer sleeve after passing through the proximal inlet or the distal inlet of the gathering member.

8. The plugging device according to claim 7, wherein the gathering member is arranged at a proximal end of the first part or the second part; one end of each of the plurality of braiding filaments is a proximal end; when the proximal ends of the plurality of braiding filaments are received and fixed by the proximal inlet of the gathering member, the gathering region of the film member is at least partially fixed between the inner sleeve and the outer sleeve via the proximal inlet of the gathering member; or, when the proximal ends of the plurality of braiding filaments are received and fixed by the distal inlet of the gathering member, the gathering region of the film member is at least partially accommodated or fixed between the inner sleeve and the outer sleeve via the proximal inlet or the distal inlet of the gathering member.

9. The plugging device according to claim 7, wherein the gathering member is arranged at a distal end of the first part or the second part; one end of each of the plurality of braiding filaments is a distal end; when the distal ends of the plurality of braiding filaments are received and fixed by the proximal inlet of the gathering member, the gathering region of the film member is at least partially accommodated or fixed between the inner sleeve and the outer sleeve via the proximal inlet or the distal inlet of the gathering member; or, when the distal ends of the plurality of braiding filaments are received and fixed by the distal inlet of the gathering member, the gathering region of the film member is at least partially accommodated or fixed between the inner sleeve and the outer sleeve via the distal inlet of the gathering member.

10. The plugging device according to claim 1, wherein the gathering member further comprises an intermediate sleeve which is hollow and sleeved between the inner sleeve and the outer sleeve.

11. The plugging device according to claim 10, wherein one end of each of the plurality of braiding filaments is accommodated or fixed between the outer sleeve and the intermediate sleeve, or one end of each of the plurality of braiding filaments is accommodated or fixed between the intermediate sleeve and the inner sleeve.

12. The plugging device according to claim 11, wherein the proximal end part of the outer sleeve and a proximal end part of the intermediate sleeve are enclosed to form an outer side proximal inlet of the gathering member, and the proximal end part of the intermediate sleeve and the proximal end part of the inner sleeve are enclosed to form an inner side proximal inlet of the gathering member; the distal end part of the outer sleeve and a distal end part of the intermediate sleeve are enclosed to form an outer side distal inlet of the gathering member; the distal end part of the intermediate sleeve and the distal end part of the inner sleeve are enclosed to form an inner side distal inlet of the gathering member; the gathering member is arranged at the proximal end of the first part or the second part; one end of each of the plurality of braiding filaments is a proximal end; and one end of each of the plurality of braiding filaments is accommodated or fixed to the gathering member after passing through one of the outer side proximal inlet, the outer side distal inlet, and the inner side distal inlet.

13. The plugging device according to claim 11, wherein the proximal end part of the outer sleeve and a proximal end part of the intermediate sleeve are enclosed to form an outer side proximal inlet of the gathering member, and the proximal end part of the intermediate sleeve and the proximal end part of the inner sleeve are enclosed to form an inner side proximal inlet of the gathering member; the distal end part of the outer sleeve and a distal end part of the intermediate sleeve are enclosed to form an outer side distal inlet of the gathering member; the distal end part of the intermediate sleeve and the distal end part of the inner sleeve are enclosed to form an inner side distal inlet of the gathering member; the gathering member is arranged at the distal end of the first part or the second part; one end of each of the plurality of braiding filaments is a distal end; and one end of each of the plurality of braiding filaments is accommodated or fixed to the gathering member after passing through one of the outer side proximal inlet, the inner side proximal inlet, and the outer side distal inlet.

14. A plugging device, comprising: a first part, wherein the first part comprises a plurality of braiding filaments and a gathering member; one end of each braiding filament is fixed to the gathering member; the first part is provided with at least one disc face, one or more of the plurality of braiding filaments form a gathering portion by shape convergence; the gathering member is located in a space enclosed by the gathering portion; and at least one disc face formed by the cooperation of the gathering portion is flat and sealed;
wherein the gathering portion comprises a first gathering portion and a second gathering portion; the first gathering portion and the second gathering portion are proximate to each other without an external force, so as to encircle the gathering member in a space enclosed by the first gathering portion and the second gathering portion; and the first gathering portion and the second gathering portion can be away from each other under the action of an external force; and
wherein a maximum outer diameter of a gap formed after the first gathering portion and the second gathering portion are proximate to each other is less than or equal to 5 mm; or the first gathering portion and the second gathering portion are proximate to each other and are fitted to each other at least in a radial direction.

15. The plugging device according to claim 14, wherein the first gathering portion comprises at least one bulge; the second gathering portion comprises at least one recess; and, after the first gathering portion and the second gathering portion are proximate to each other, the at least one bulge is abutted against one recess.

16. The plugging device according to claim 14, wherein the first part is further provided with a reset member; and, after the external force is withdrawn from the first gathering portion and the second gathering portion, the reset member gathers the first gathering portion and the second gathering portion.

17. The plugging device according to claim 14, wherein the plugging device further comprises a film member, and the film member at least covers part of an outer surface of the gathering portion.

* * * * *